United States Patent
Cambron

(10) Patent No.: US 7,180,854 B2
(45) Date of Patent: Feb. 20, 2007

(54) ROUTE ON FAILURE METHOD AND APPARATUS FOR AUTOMATIC REROUTING NETWORK TRAFFIC THROUGH A RECONFIGURABLE, INTELLIGENT SIGNAL MULTIPLEXER UPON FAILURES OF MULTIPLEXER COMPONENTS OR OF NETWORK SPANS

(76) Inventor: Keith Cambron, 1031 Seneca Ct., Walnut Creek, CA (US) 94598

( * ) Notice: Subject to any disclaimer, the term of this patent is extended or adjusted under 35 U.S.C. 154(b) by 972 days.

(21) Appl. No.: 10/119,272

(22) Filed: Apr. 10, 2002

(65) Prior Publication Data

US 2003/0198180 A1    Oct. 23, 2003

(51) Int. Cl.
*H04L 12/24* (2006.01)
*H04Q 3/00* (2006.01)

(52) U.S. Cl. .............. 370/227; 370/228; 370/419; 709/223

(58) Field of Classification Search ........... 370/216, 370/218, 229, 241, 442, 441, 423, 463, 250, 370/360, 437, 535, 539, 541, 227, 228, 408, 370/345; 709/221, 233, 278, 220, 321, 222, 709/250, 223–230; 714/7, 1–5
See application file for complete search history.

(56) References Cited

U.S. PATENT DOCUMENTS

| | | | | |
|---|---|---|---|---|
| 5,166,925 A | * | 11/1992 | Ward ..................... | 370/250 |
| 5,615,211 A | * | 3/1997 | Santore et al. ........... | 370/419 |
| 5,796,729 A | * | 8/1998 | Greaney et al. .......... | 370/345 |
| 5,887,158 A | * | 3/1999 | Sample et al. ........... | 716/15 |
| 5,901,323 A | * | 5/1999 | Milliken et al. ......... | 719/321 |
| 6,003,077 A | * | 12/1999 | Bawden et al. .......... | 709/223 |
| 6,005,841 A | * | 12/1999 | Kicklighter .............. | 370/217 |
| 6,145,072 A | * | 11/2000 | Shams et al. ............ | 712/22 |
| 6,260,155 B1 | * | 7/2001 | Dellacona ................ | 714/4 |
| 6,377,543 B1 | * | 4/2002 | Grover et al. ............ | 370/227 |
| 6,389,464 B1 | * | 5/2002 | Krishnamurthy et al. ... | 709/220 |
| 6,421,349 B1 | * | 7/2002 | Grover .................... | 370/408 |
| 6,477,566 B1 | * | 11/2002 | Davis et al. .............. | 709/223 |

OTHER PUBLICATIONS

Towards TMN-Based Integrated Network Management Using CORBA and Java Technologies—group of 4 >>JY Kim, HT Ju, JWK Hong, SB Kim—Special Issue on New Paradigms in Network Management, 1999.*
Network element management architecture for the 7 R/ETM Trunk Access Gateway Kevin K. W. Whang , Rajnish Jain , Paul Chan.*

\* cited by examiner

*Primary Examiner*—Hassan Kizou
*Assistant Examiner*—Salman Ahmed
(74) *Attorney, Agent, or Firm*—Harris Zimmerman

(57) ABSTRACT

A modular, reconfigurable, intelligent signal multiplexer for telecommunications purposes includes multiple feature cards. Each feature card contains an embedded microprocessor with associated RAM memory and flash ROM. The signal multiplexer processes digital inputs from a wide range of user equipment for transmission over digital facilities, including T1 and T3 lines. The system employs an Advanced Intelligent Multiplexer Network software package to perform network configuration and the establishment of maps. The maps including alternate maps, which in an embodiment include time-of-day-specific alternate routes. The functions of the signal multiplexers of a network are controlled by a mapping scheme. A map change alters the circuit-to-time slot assignments.

20 Claims, 23 Drawing Sheets

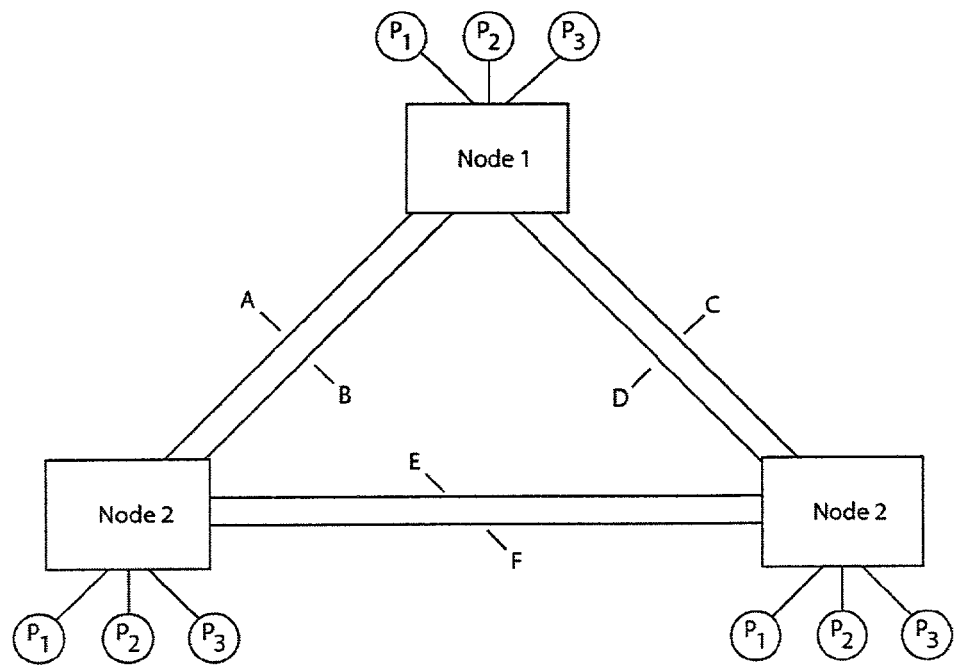
FIG. 11
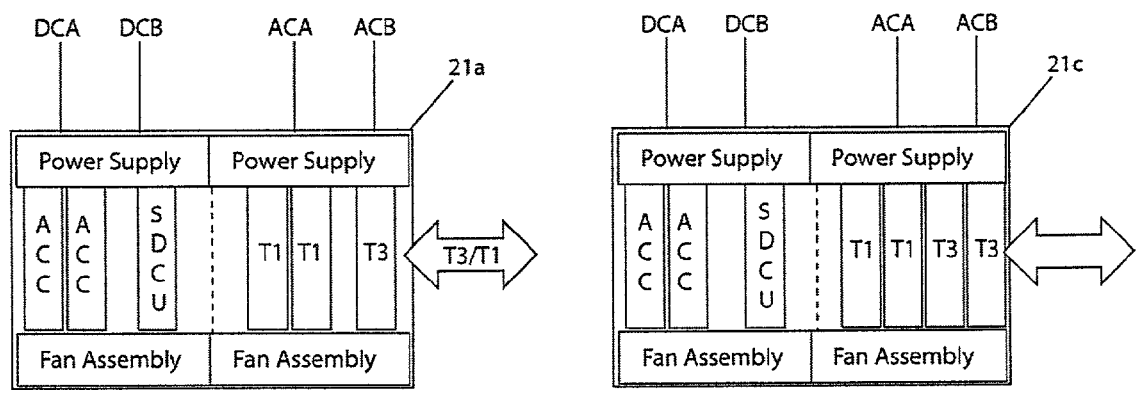
FIG. 12                    FIG. 13

ROUTE ON FAILURE METHOD AND APPARATUS FOR AUTOMATIC REROUTING NETWORK TRAFFIC THROUGH A RECONFIGURABLE, INTELLIGENT SIGNAL MULTIPLEXER UPON FAILURES OF MULTIPLEXER COMPONENTS OR OF NETWORK SPANS

RELATED APPLICATIONS

This application is related to, and claims priority from, copending U.S. patent application Ser. No. 09/232,611 filed on Jan. 19, 1999 having common inventorship and common ownership.

FIELD OF THE INVENTION

The invention Route on Failure, relates to the field of routing telecommunications traffic through digital communications networks. In particular, the invention relates to methods and apparatus capable of automatically rerouting network traffic on failure of network spans or of components of an intelligent time-division multiplexer (TDM).

BACKGROUND OF THE INVENTION

In the early part of the 20th century, long-distance telephone companies, primarily AT&T/Bell Telephone, made significant investments to establish an infrastructure of trunk lines running between the major cities. During the past 30 years, telephone companies have sought to upgrade this infrastructure with systems capable of high-speed digital connections.

To accomplish this conversion, trunk circuits and switching systems have been redesigned from analog to digital equipment. In older analog systems, each wire pair in the copper cable comprised a dedicated circuit supporting only one voice or data connection. Because of the high cost of copper cable, special equipment was developed to carry more than one speech conversation on a pair of wires. This technique, known as multiplexing, combines the data from several telecommunications devices onto one communications span. At the other end of the span, another multiplexer splits the data and routes it appropriately. The two common types of multiplexing are frequency multiplexing and time division multiplexing. Frequency division multiplexing, which involves dividing a trunk line's available bandwidth into discrete frequency bands, was used for transmitting multiple analog circuits via one pair of twisted copper wires. Time division multiplexing (TDM), which allocates discrete, reiterated time slots for each circuit, was developed to accommodate multiple digital transmission services sent over a single circuit.

In conjunction with TDM, the T1 digital carrier system was developed in the 1960's as a short distance transmission system for carrying digital signals over a single twisted pair of copper wires without interference. The bandwidth of a T1 line is 1.544 Mbps, yielding a capacity for 24 64 kbps digital channels and 8 kbps for keeping the ends of the trunk synchronized by imposing a framing process. To make use of the T1 system, voice signals are converted into digital format, generally using a pulse code modulation (PCM) encoding scheme.

Conversion of voice and other analog sources to digital format is carried out by a channel bank, which samples each of the 24 analog circuits at a rate of 8000 times per second to produce a snapshot of the analog signal at precisely synchronized instants. The amplitude of the snapshot is rounded off to the nearest of several specific, predetermined levels, in a quantization process. The quantified snapshot level is converted into an 8 bit binary representation of the analog signal. Thus, every channel is represented by an 8 bit PCM byte for analog signals, or one data byte for digital signals.

The term 'channel bank' is used because it may contain sufficient processing power to encode to digital format a bank of up to 24 individual channels per T1 port, and to decode these channels as well. Thus one channel bank encoding up to 24 channels may generate the composite digital signal to feed one T1 circuit. A channel bank is required at both ends of the T1 circuit.

Modem T1 circuits are formed by two twisted-pair cables (four wires total), enabling nodes at either end of a T1 line to transmit and receive in both directions simultaneously in full duplex mode. A T1 multiplexer divides a T1 line into 24 separate 64 kbps channels, each channel comprising a digital signal level 0 (DS-0). The multiplexed T1 signal format is termed digital signal level I (DS-1). The T1 digital carrier system can carry both data and non-data traffic, such as voice and video, because all these types of transmitted information can be digitally encoded. Therefore, the T1 line can carry "integrated" traffic so that a customer does not need to have separate lines (or trunks) for voice, video, and data.

A multiplexer placed at each end of a T1 line acts like a funnel allowing multiple sources and formats to be mixed at the transmitting end and to be extracted and appropriately routed at the receiving end. A T1 multiplexer typically consists of a T1 interface, a strobe unit, a power source, and control logic. Multiplexer devices also usually contain open slots to accommodate various types of channel cards, such as line cards or feature cards. The two most common types of channel cards are designed to support voice or data applications. A voice card provides a connection to an analog circuit, and carries out the digital to analog and analog to digital conversions. A data card provides a connection to a digital circuit, and may reformat or reframe the signal. The T1 multiplexer combines the digital signals from the voice and data channel cards and combines them into a single 1.544 Mbps circuit of 24 DS0s.

For users who need less than 1.544 Mbps bandwidth, telecommunication companies offer fractional T1 service, allowing users to pay for the portion of the T1 bandwidth they use. This approach makes leased services more affordable for small businesses. For users who require more than the T1 bandwidth, telecommunications companies offer T3 trunks with a capacity of 28 multiplexed T1 lines, equivalent to 672 DS-0s, with a bandwidth of 44.7 Mbps. The T3 line is referred to as a digital signal level 3 (DS-3) channel.

Although the multiplexing and transmission of telecommunications traffic appears straightforward in conceptual terms, the actual task of setting up and managing a telecommunications system is extremely complex. A wide variety of input signals must be accepted, such as analog and digital voice, data, video, fax, modem, LAN/WAN, Internet and intranet, and the like. These inputs may have differing protocols, framing, and timing, and must be reliably synchronized, transmitted and decoded. Circuits must be set up and maintained without interruption or fault, and signals must be routed to and from a large number of telecommunications devices. Bandwidth requirements may change on a regular basis, according to workday schedules, or may change abruptly due to unexpected demands. At any node on a transmission system, some channels may be required to be unloaded and replaced with other signals, whereas other channels may be passed through the node without alteration. These factors all contribute to an extremely complex signal processing environment.

SUMMARY OF THE INVENTION

Everything built by man, including communications networks, can and does fail on occasion. Network spans are particularly vulnerable to span failure. Common causes of span failures include weather, human error, and misdirected construction equipment. Span failures often occur in clusters, for example a misdirected backhoe breaking a cable will cut all spans in the cable simultaneously, as may an ice storm that causes breakage of cables and/or poles. There may also be local failures of portions of the network nodes.

An aspect of the invention is a modular, reconfigurable, intelligent signal multiplexer for telecommunications purposes. The multiplexer is intended for use as a node of a network, and is comprised of a rack or shelf adapted to support a plurality of printed line cards.

Multiplexers have two sets of circuits, access circuit and network circuits (or spans). Access circuits are used at the serving location of the node to provide lower speed voice and data circuits that are interconnected to phones, PBXs, routers and other terminating devices. These access circuits terminate on the multiplexer and their information is combined onto the network circuits or spans to enable them to travel great distances through carrier networks. The amount of data on an access circuit varies according to the needs of the application. They vary from sub-rate (less than one DS-0) to T1 rates (24 DS-0s). The process of assigning access circuits to network spans within the multiplexer is called mapping. A multiplexer map carries the connection information that specifies which access circuits are assigned to a particular network span, or set of spans. Correct mapping is crucial since the network nodes at the ends of every network span must agree on the mapping to enable the voice and data access circuits to reach the correct destinations.

Multiplexers can support more than one map, although only one map can be active at a given time, and the two nodes associated with a span must have identical maps at any given time or the data on the span will be misrouted.

A specific map becomes active in response to user-specified times, a predetermined event, an alarm, or a manual keyboard command. Maps may be set, changed, and verified using standard and enterprise MIBs, through the graphical user interface and verified by SNMP.

Time-triggered maps reconfigure the multiplexer automatically at a specified time. For example, voice circuits can be decreased, and high speed data capacity can be increased for evening and weekend operations, when few employees are using voice circuits. This feature allows data backups and file transfers to be processed more quickly during off-peak hours. Event-triggered maps are switched on by an event, such as a disaster situation or a demand requirement; e.g., a video transmission or the like. Alarm-triggered maps are switched on by predetermined alarm conditions, such as Bit Error Rate Alarm, or Red or Yellow Alarms. The system supports common Bell System alarms, including Local alarm, Remote alarm, and Carrier Group Alarm (CGA).

A graphical user interface network manager (hereinafter, Advanced Intelligent Multiplexer Network, or AIM-Net) is provided for creating and modifying maps of the system.

In another aspect of the invention, the AIM-Net graphical user interface presents iconic representations of network connections, and enables the user to define nodes and draw graphic links on a display screen. AIM-Net then facilitates the design of the network nodes and connections using a graphic interactive presentation to the user. The user can specify the number of network ports in each intelligent multiplexer at each node and the node connections, and can move and re-arrange these objects on-screen. After the network topology is laid out on-screen, the user may add spans, which are actual circuits, to the links, which are logical pathways. Spans may include T1, and T3 circuits.

The user can first select the type of span they wish to add, and the software searches both nodes for compatible line interface units, and then displays the first compatible span having available bandwidth that it finds as well as the line interface unit information, including slot number, port number, and available bandwidth.

Once the design is completed on-screen, it is translated into an appropriate map and sent to all the nodes. These maps can include time of day and day of week constraints.

At the real nodes which correspond to the graphical node representations used in the on-screen design process, each node is polled to verify that all the cards assigned to each node are actually in place, and that the card slots are properly configured. Node configuration data is displayed on-screen, and update requirements may be entered. Likewise, maps for each node may be received, examined, and updated. The network design may then be implemented.

Route on failure is a combination of three elements: 1) AIM graphical user interface network manager, 2) fault tolerant routing which uses proprietary design algorithm, and 3) alarms. The network manager may be used to assign a priority value to any channel connected thereto. If one or more of the internode spans becomes non-functional or unavailable, this occurrence is treated as a triggering event, and AIM responds by rerouting the failed channels to functioning span(s) so that communications traffic having higher priority is routed first, while the lowest priority traffic may be sacrificed.

AIM-Net provides for pre-selection of multiple alternate routes for priority traffic, and stores these in maps. When preselecting alternate routes, the GUI software automatically provides suggested routes based upon its knowledge of network configuration and previously assigned traffic priorities. The user need not select any of these routes and may define additional routes.

Upon failure of a span, that span's traffic is rerouted according to the next alternate route specified in the maps, bumping any lower priority traffic already on those spans. When repair of a span is detected, traffic is automatically rerouted to the prior alternate route (if the repaired span was an alternate route) or to the original route (if the repaired span was the original route). When a route becomes available because traffic has been rerouted onto the original or a higher priority alternate, any bumped traffic is restored automatically, without operator action. AIM-Net can be configured to operate in a redundant mode, in which each node operates critical components connected in a failover configuration: including power supply and fan assemblies, and central controller line cards. If a critical component fails, the system switches to the backup component with a minimum of disruption. Likewise, a node may be configured with redundant network ports, one being active and the other being standby. In the event of a failure of the network port, the central controller of the node detects the failure, activates the standby port, and remaps all circuits to the newly activated port.

BRIEF DESCRIPTION OF THE DRAWINGS

FIGS. 5-1 to 5-14 are a sequence of views of screen displays (screen shots) provided by the graphical user interface of the user control software package, AIM-Net.

FIG. 6 is a function block diagram depicting the operating relationship between the reconfigurable intelligent multiplexer and the associated telecommunications network and the graphical user interface.

FIG. 7 is a function block diagram illustrating the operation of a typical line card of the reconfigurable intelligent multiplexer of the invention.

FIG. 8 is a functional block diagram of the channel bank operation of the reconfigurable intelligent multiplexer of the invention.

FIG. 9 is a functional block diagram of the M13 multiplexer operation of the reconfigurable intelligent multiplexer of the invention.

FIG. 10 is a functional block diagram of the digital cross-connect operation of the reconfigurable intelligent multiplexer of the invention.

FIG. 11 is a functional block diagram depicting the routing and priority assignments of a three node ring communications system constructed in accordance with the invention.

FIG. 12 is a block diagram depicting a typical fault tolerant redundant configuration of a reconfigurable intelligent multiplexer node of the invention.

FIG. 13 is a block diagram depicting a typical fault tolerant redundant configuration of a T-3 span reconfigurable intelligent multiplexer node of the invention.

FIG. 14 is a block diagram depicting a typical non-fault tolerant simplex configuration of a T-3 span reconfigurable intelligent multiplexer node of the invention.

FIG. 15 is a block diagram depicting a typical high bandwidth D/I MUX hub configuration of a T-3 span reconfigurable intelligent multiplexer node of the invention.

DESCRIPTION OF THE EMBODIMENTS

Figure 1:
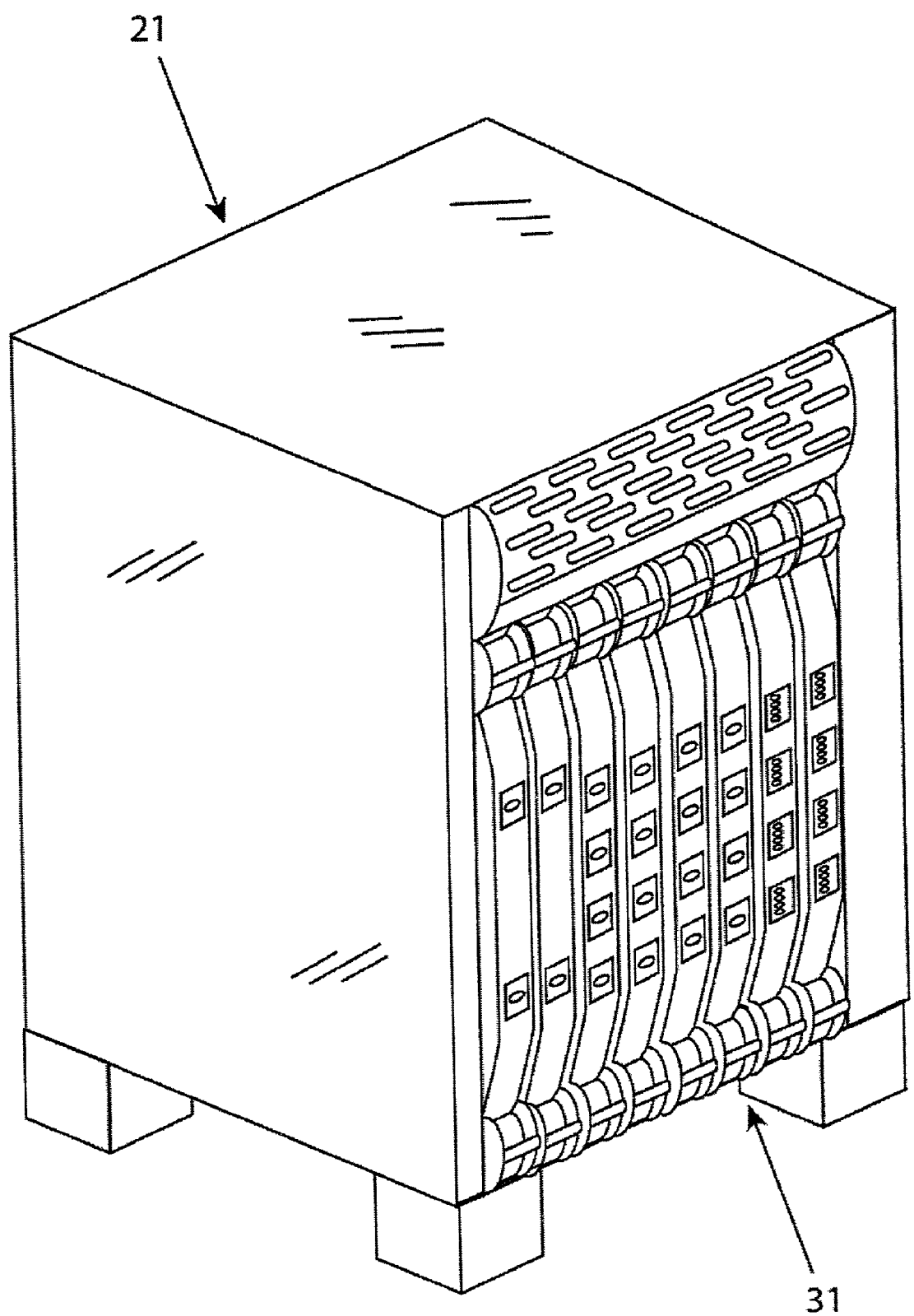
FIG. 1 is a perspective view of the reconfigurable intelligent multiplexer of the present invention.

The present apparatus generally comprises in one aspect a modular, reconfigurable, intelligent signal multiplexer, drop and insert device, and integrated access device for telecommunications purposes. With regard to FIGS. 1 and 2, the multiplexer includes a cabinet housing 21 enclosing a shelf structure 22. The shelf 22 defines a plurality of card slots 23 in parallel array, each slot 23 including one or more backplane connectors 24. In addition, each slot 23 includes one or more midplane connectors 26. All of the slots 23 are substantially identical in configuration. The backplane connectors 24 preferably comprise standard telecommunications connectors, and the midplane connectors 26 comprise standard data connectors.

The intelligent multiplexer also includes a plurality of line cards 31 having substantially identical conformations, the line cards 31 being configured to be placed in any of the slots 23 of the shelf 22 in interchangeable fashion. Each circuit card 31 includes one or more backplane connectors 32 projecting from a lower interior edge thereof and adapted to mate with the backplane connectors 24 of the shelf unit 22. Likewise, each circuit card 31 is provided with one or more midplane connectors 33 extending from the upper portions of the interior edge of the card and adapted to mate with the midplane connectors 26 of the shelf unit 22. The backplane connectors 24 are joined to telecommunications circuits extending to public or private carrier lines, as well as to customer equipment such as telephones, LAN/WAN, modems, fax machines, video systems, and any other signal that may be carried by telecommunications circuits. The midplane connectors 26 are interconnected among the slots 23 to provide data communication between and among the line cards 31 placed into the unit, and also provide power connections. Thus any circuit card 31 may be placed in any of the slots 23 and be connected to electrical power, joined to the other line cards in data communication, and connected to incoming/outgoing telecommunications circuits. The shelf 22 also includes at least one power supply for the line cards 31 and a fan assembly to remove heat and maintain proper operating temperatures.

Each of the line cards 31 include an embedded microprocessor, such as a Motorola 68000-series device, with an associated operating system, as well as RAM memory and flash ROM. Two categories of line cards 31 are provided: central controller cards, and feature cards. Feature cards may include line cards, channel bank cards, and the like, as described in the following specification. A minimum configuration of the intelligent multiplexer system comprises at least one central controller card, and at least one feature card. A significant aspect of the invention is that the system may be expanded or reconfigured as required by the telecommunications tasks assigned to the intelligent multiplexer. In this regard, the provision of a microprocessor and operating system on each circuit card 31 renders the cards software independent and capable of reconfiguration without requiring new common equipment or system wide software upgrades.

Figure 3:
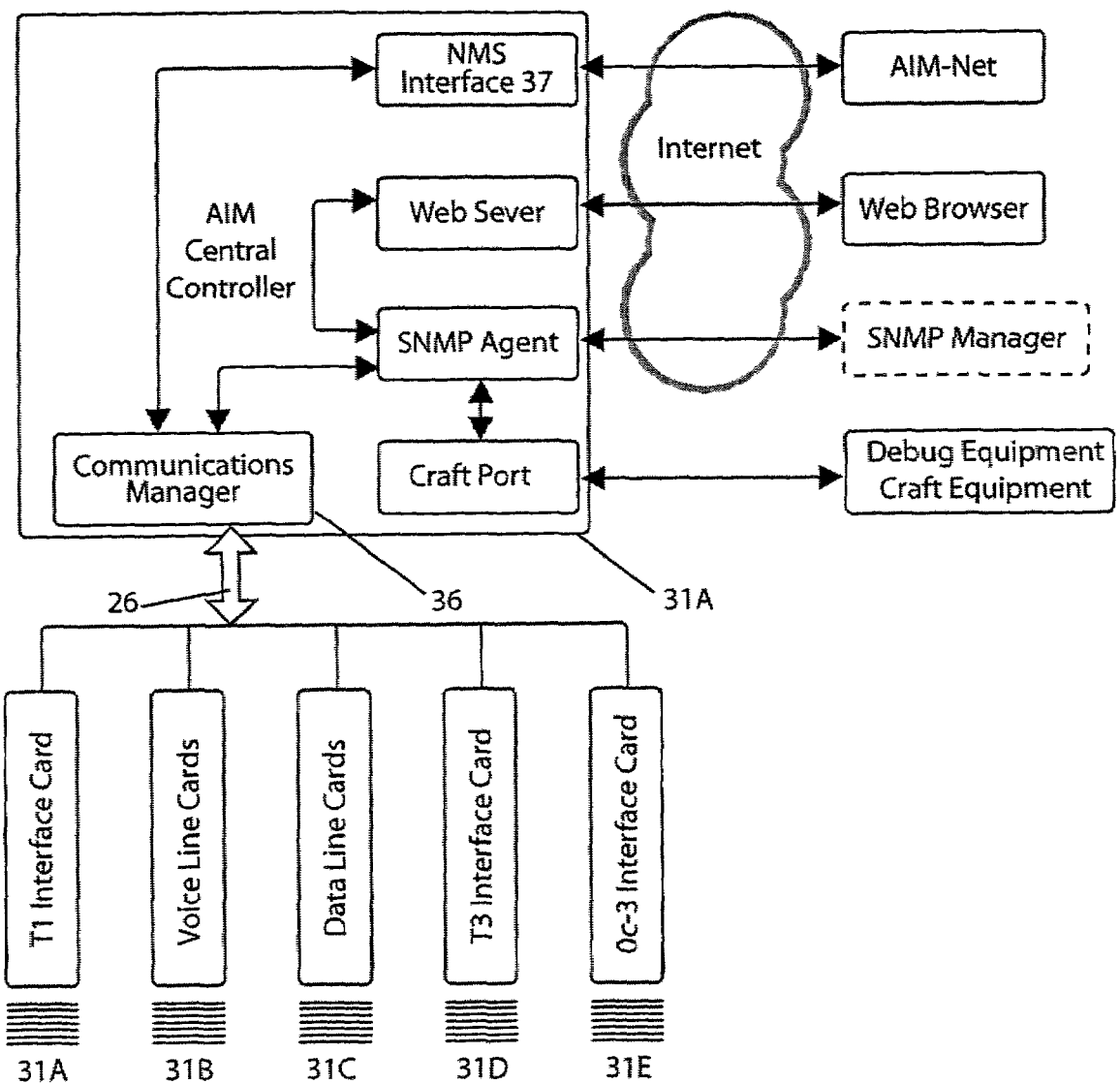
FIG. 3 is functional block diagram depicting the operational scheme of the reconfigurable intelligent multiplexer of the invention.

With regard to FIG. 3, a central controller card 31A is configured to provide a communications manager 36 which delivers all messages among the other line cards 31 through the midplane connectors 26. The other line cards may comprise voice line cards 31B, data line cards 31C, T1/T3 cards, OC3 cards, and video cards, and other feature cards described below. The central controller 31A also includes a web server 37 which acts as an Internet gateway by implementing the HTTP protocol, and a SNMP Agent which is connected through the telecommunications lines of the backplane connectors 24 and the Internet (or equivalent network) to an external web browser and to a SNMP Manager. Each feature card and line card is provided with an SNMP Sub-Agent. The SNMP Agent or Sub-Agent acts as a server for interchanging system specific data (SNMP Management Information Base Objects) with SNMP Managers located outside the central controller card. SNMP is an acronym for Simple Network Management Protocol, an IETF standard protocol for network control. SNMP is implemented commercially in the application OpenView™, produced by the Hewlett Packard Corporation, or Net Manager™, produced by Sun Microsystems Corporation. An external computer hosting the Manager may be linked to the central controller through an Ethernet or 10base-T network for these control functions.

The SNMP network-management architecture contains three primary elements: a manager, agents, and a Management Information Base (MIB). The SNMP manager is the interface through which the network administrator performs network management functions, such a fault, configuration, security, performance, and accounting management. SNMP managers are software products from different companies designed in standardized format to run on almost any kind of computer. Any of these managers can control any kind of device, assuming the devices are designed to support SNMP. SNMP agents and sub-agents are the entities that interact with the devices being managed. All SNMP-compatible devices support a SNMP software agent, which enables a management station to poll all SNMP devices in a network.

Information regarding network status is collected in the MIB. The MIB contains variables (also termed 'objects') as defined by the managed device so they can be read or set by the manager to monitor or control the managed equipment. MIBs are text files written in a special, stylized language that the network manager can parse and use. A MIB is essentially a database of objects arranged as a tree. At the top of the MIB tree is the most general information available about a network. Each branch of the tree then gives more detail about a specific network area, with individual data items as leaves on a branch. Object identifiers uniquely identify MIB objects in the tree.

Two kinds of MIBs are used: Standard and Enterprise. Standard MIBs are generic information bases describing common features of many equipment types. Examples of standard MIBs include MIB-II and the DS-1 MIB. MIB-II describes various system-level objects, as well as many aspects of the management interfaces and the protocols themselves. MIB-II is supported by most of the devices that support SNMP. The DS-1 MIB has some common variables relevant to T1 lines. MIB-II and the DS-1 MIB are described and included in the Request for Comments (RFC) documents RFC 1213 and RFC 1406, and are available to the public on the Internet. Standard MIBs are widely available, and SNMP managers may typically include a selection of common MIB files. Enterprise MIBs are privately maintained MIBs, which are specific to individual manufacturers and equipment, and are distributed by the organizations responsible for them. Network managers are capable of importing Enterprise MIBs to automate communication with Enterprise capable agents.

SNMP commands are usually queries from the manager to the agents on the network. SNMP managers are constantly polling agents for network status variables. SNMP transactions may include a GET, a SET, or a TRAP, as follows. The manager sends GET commands to the agent to ascertain the current configuration or state of the managed element. Specifically, the manager sends a GetRequest or GetNextRequest to the agent, the agent inspects the value of the requested MIB variables and then the agent sends a GetResponse to return the requested variables. The manager also sends SET commands to the agent to modify variables within the MIB. That is, the manager sends a SetRequest to the agent, which then alters the MIB variable(s) as instructed. The agent may send TRAPs to notify the manager of threshold crossings, restarts, and security breaches. The TRAP message is an exception to the SNMP transaction pattern, in that the TRAP is an unsolicited message sent from the agent to the manager.

The invention's SNMP agent supports MIB-II, the DS-1 MIB, the DS-3 MIB and an Enterprise MIB, as described above.

The central controller also is provided with a craft port, a serial port that provides direct access to the central controller for debugging and initial system configuration. The craft port may comprise a standard RS-232C, 9 pin connector which is adapted to be connected to a non-graphic interface terminal, such as a VT-100 or VT-220 terminal or terminal emulator or the like. As illustrated conceptually in FIG. 4, the functions of a central controller card 31A, managed by the processor 41, include providing an interface for an asynchronous terminal or a network management system. In addition, the central controller controls and monitors other common equipment and feature cards, and provides a real time clock. It also provides control of T1 clock selection, and controls alarm cutoff and bypass functions. The central controller manages all alarm functions, and also maintains a nonvolatile memory storage of the system configuration.

Figures 1, 5:
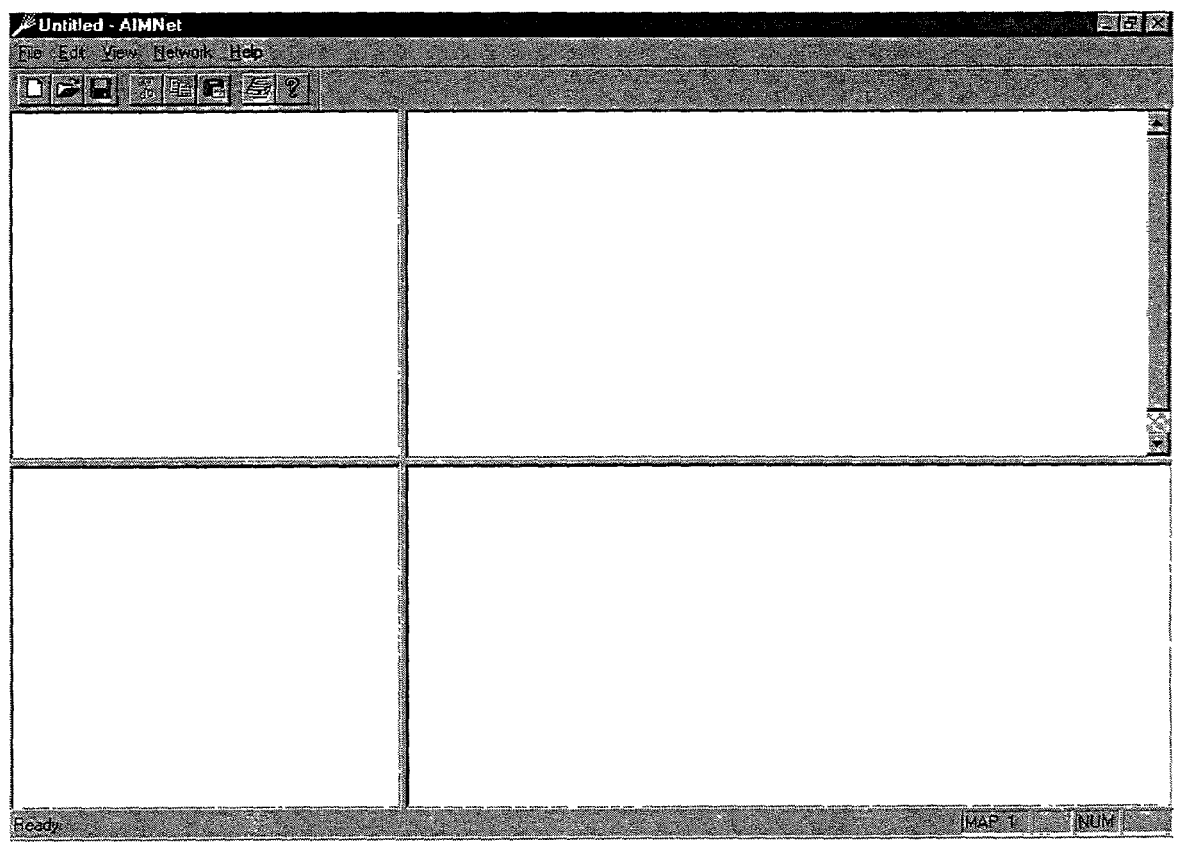
Figures 2, 5:
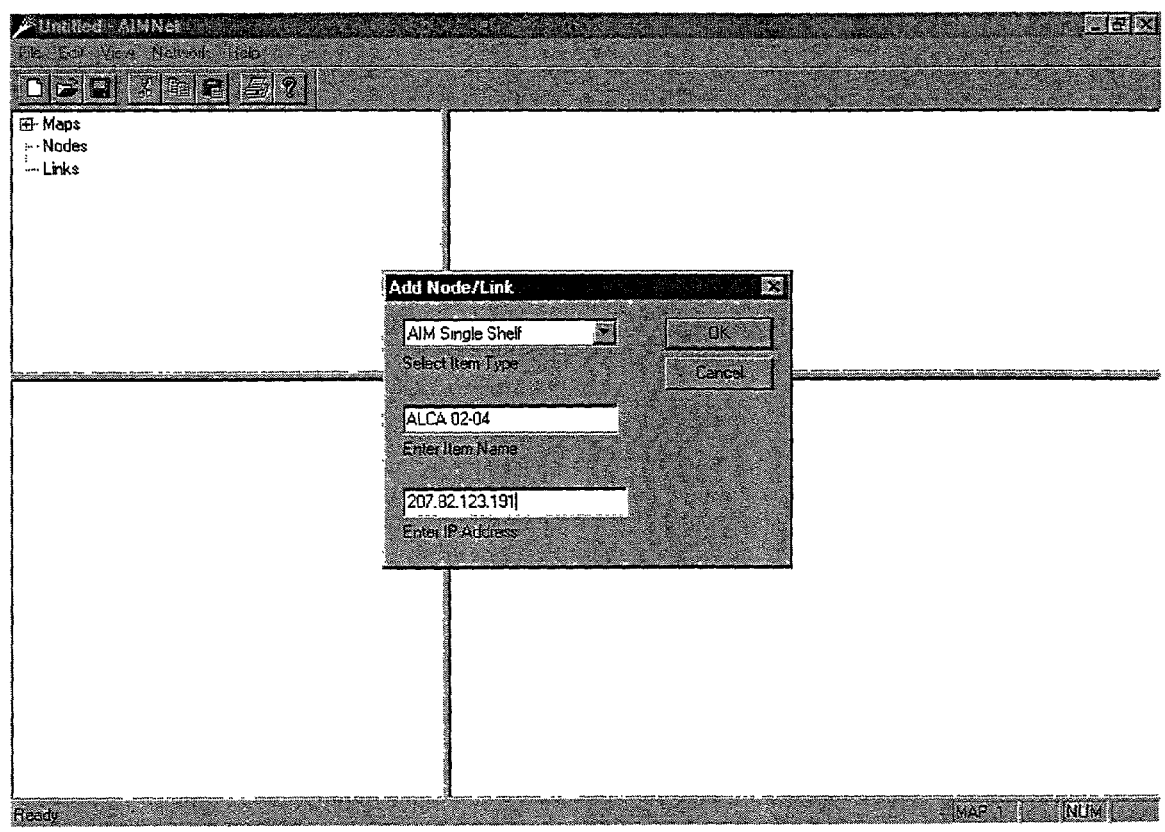
Figures 3, 5:
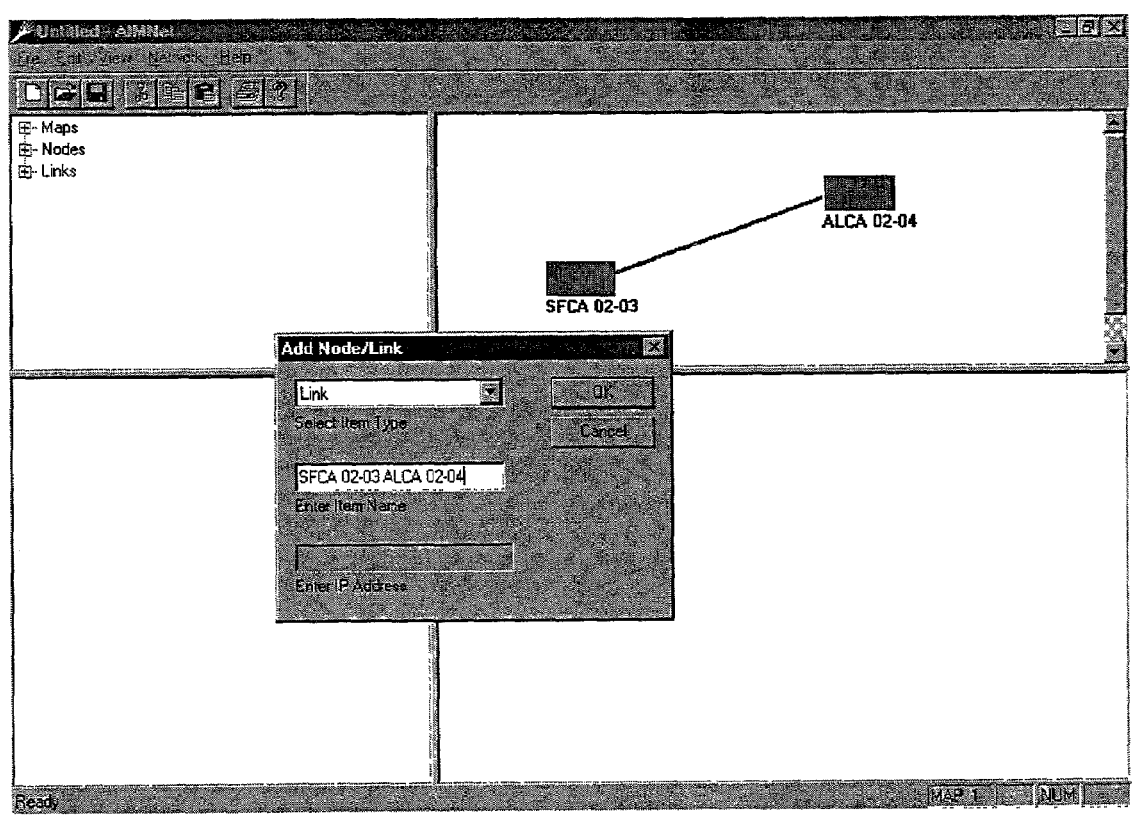
Figures 4, 5:
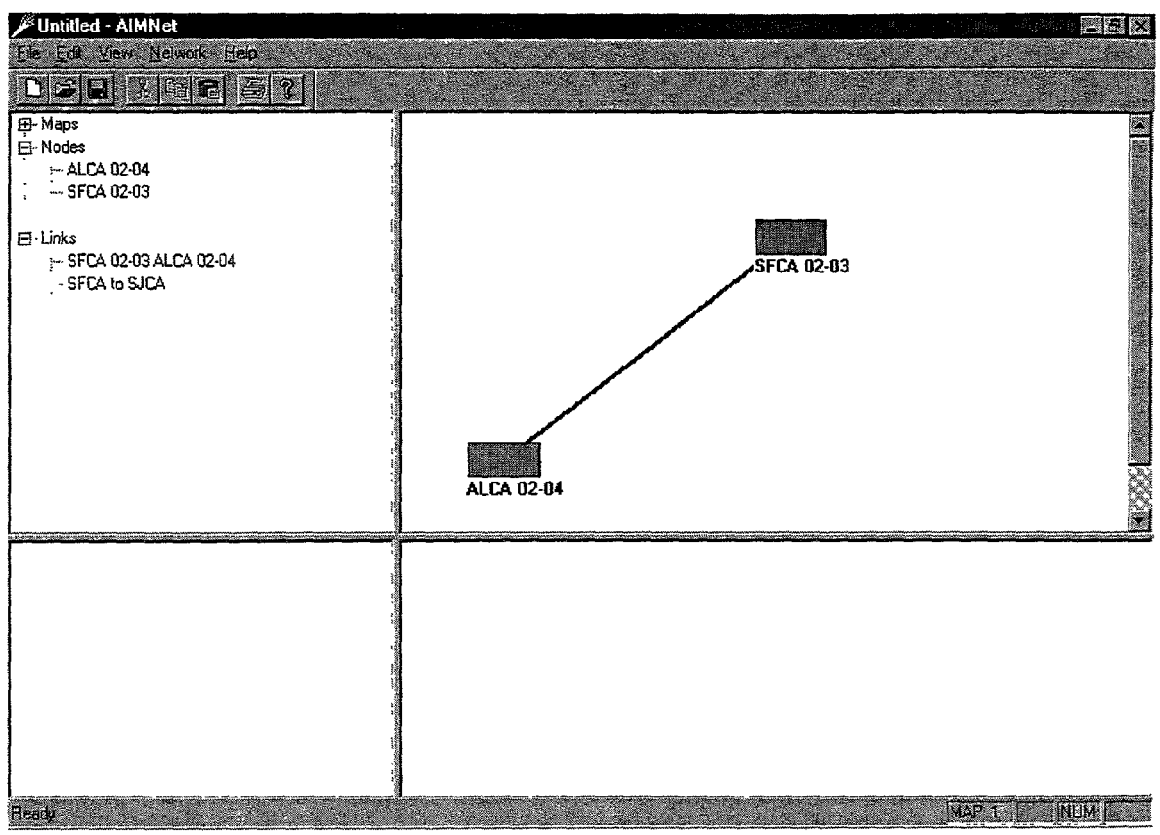
Figure 5:
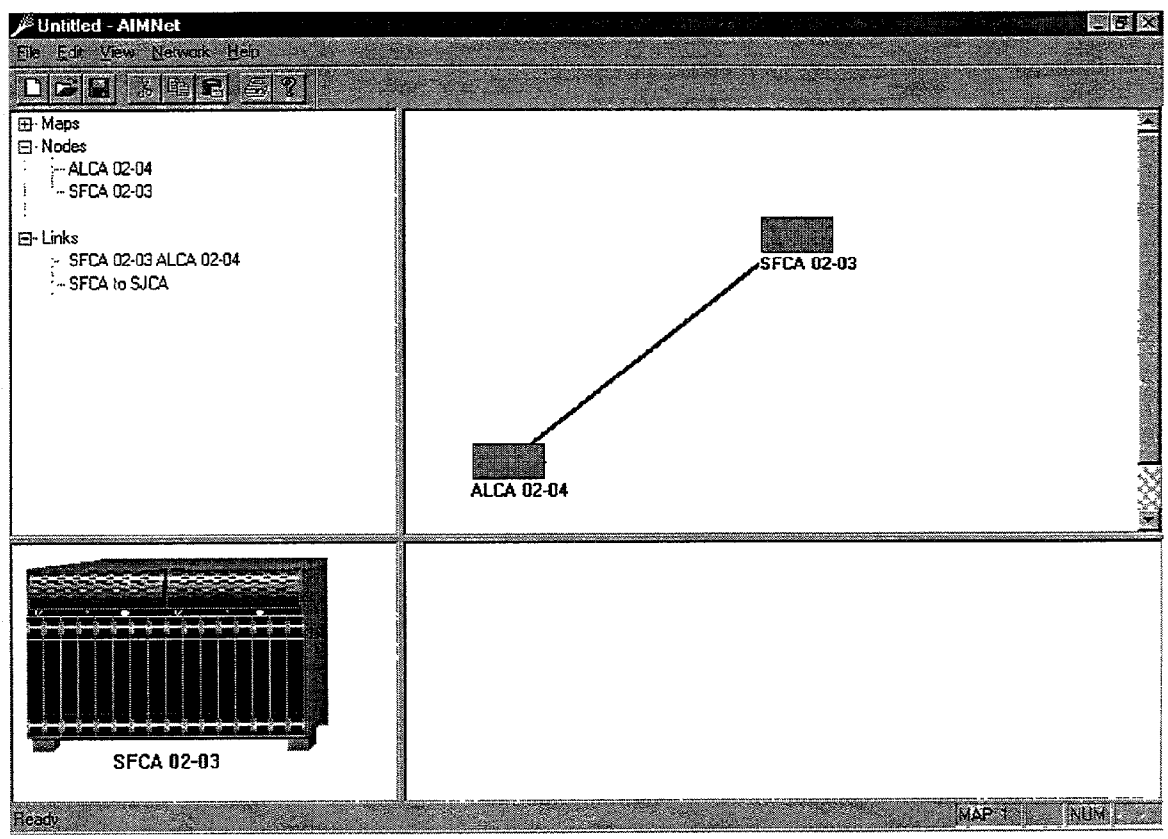
Figures 5, 6:
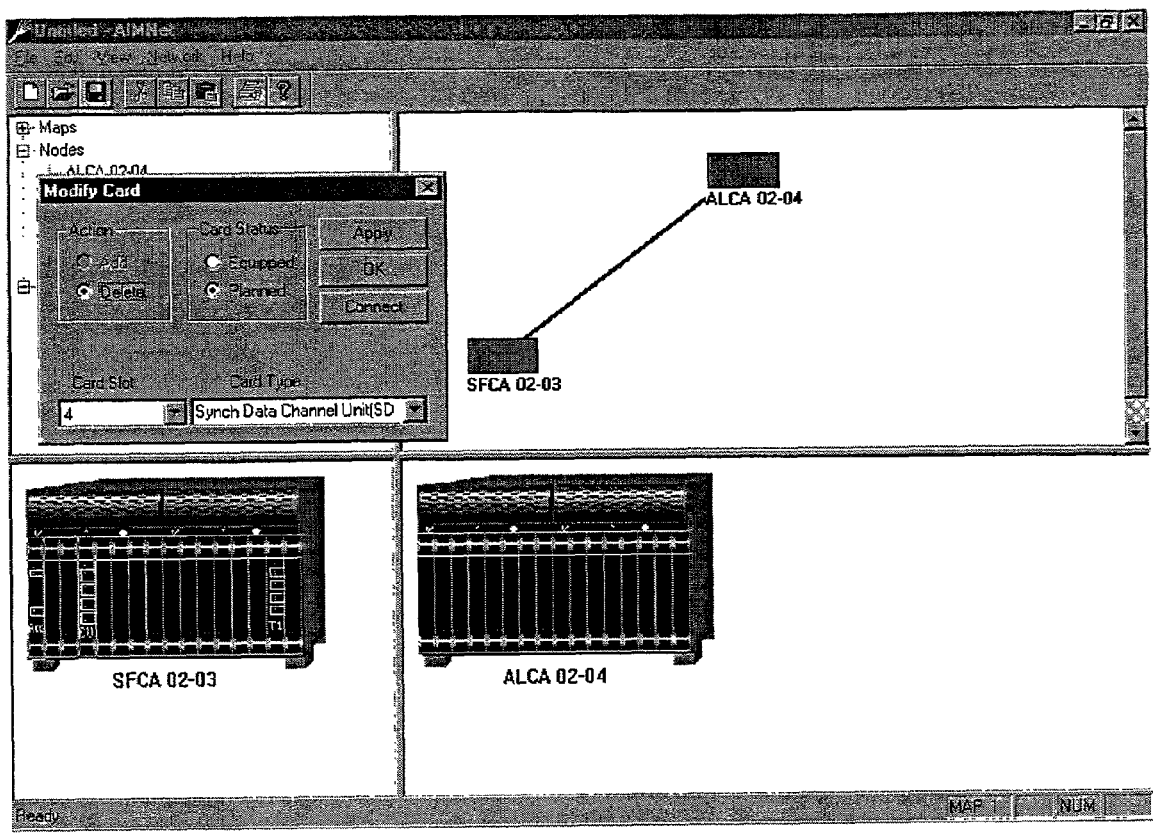
Figures 5, 6, 7:
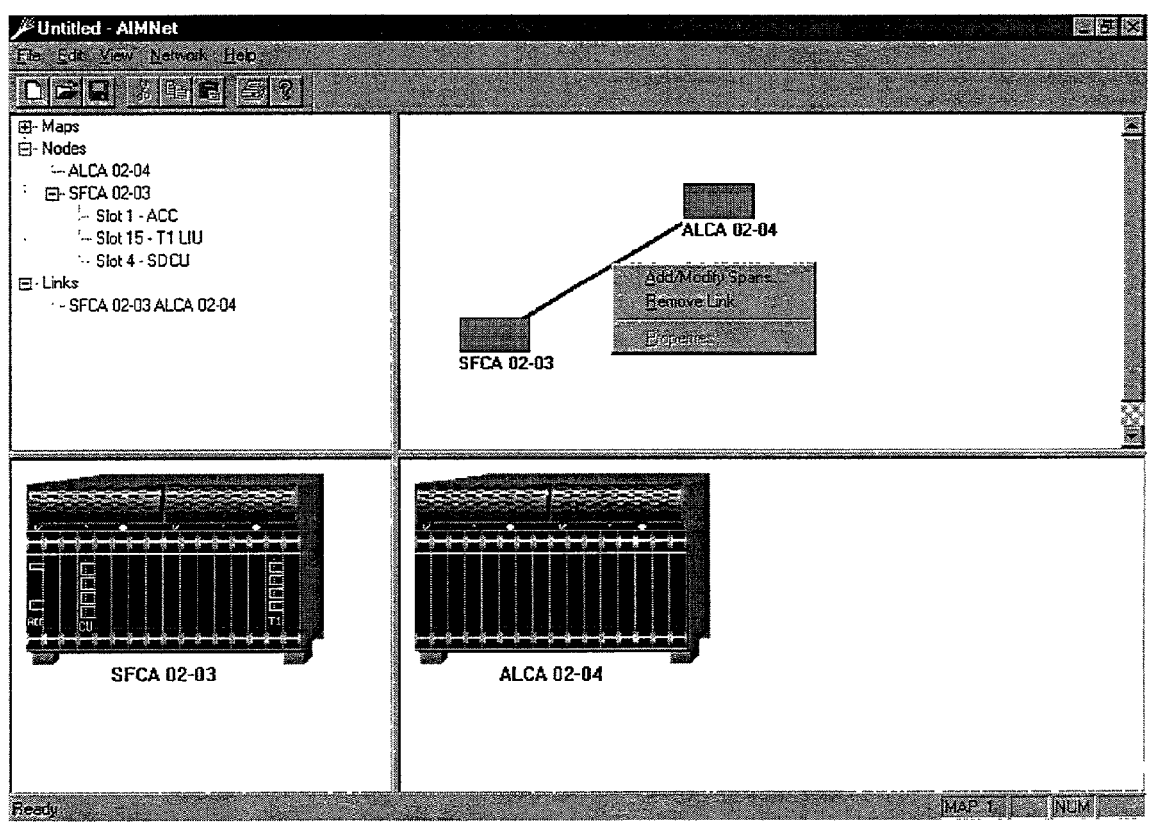

With regard to FIG. 7, a typical line card provides a network interface through the backplane connectors, and protection circuits provide the communications paths to the network interface to prevent harm to the system in the event of foreign voltage being induced on the telecommunications network circuits. A signal recovery and transmission circuit (full duplex), in this example a T-1 framer, converts network telecommunications signals into digital signals compatible with the card's logic circuits. Data to/from the network is then routed through the card using a series of multiplexer (mux) devices and buffers to mapping circuitry, which distributes the digital signals in proper time format to the system bus interface, which is provided physically by the midplane connectors of the line card. The system bus then distributes the data payload to the other feature cards of the system, from which the data may be transmitted outbound in accordance with a predetermined system wide map. Signaling information is managed separately from data payloads using s/p converters and dedicated routing circuitry. Test functions, such as Bit Error Rate Tests (BERT) are implemented in separate dedicated circuitry. Data is switched to/from the BERT circuits using multiplexer (mux) circuits. Other feature cards, as described below, are substantially similar to the T-1 line card described and depicted in FIG. 7.

Thus each feature card is entirely responsible for all of the data handling functions described above and is relatively autonomous within the overall system. This distributed processing, loosely coupled architecture enables the system to be highly reliable by removing critical interdependencies.

Figures 5, 6, 7, 8:
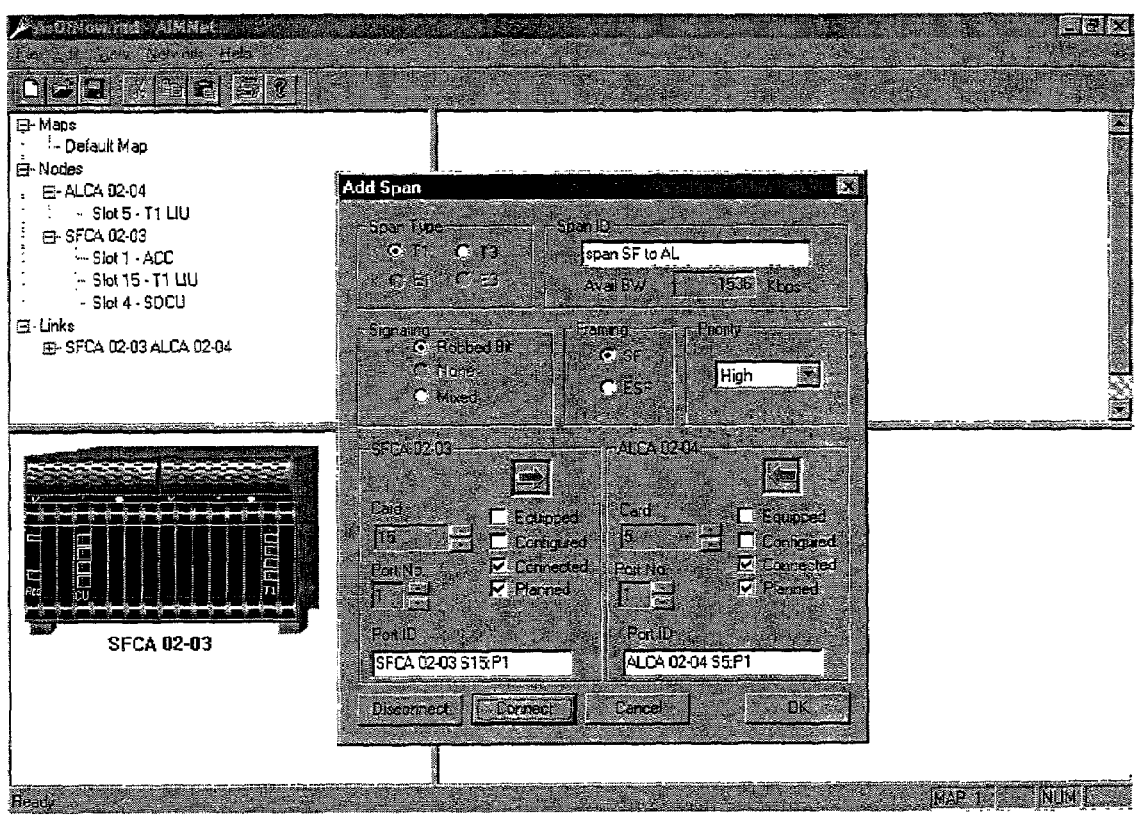

The system of the invention may also carry out channel bank function, as depicted in FIG. 8. In channel bank operation analog sources and other signals from one location are accepted into the intelligent multiplexer system by at least one access card. As shown, such access feature cards may include a Synchronous Data Channel Unit (SDCU) card, 10base-T Local Area Network(10T LAN) card, or Foreign Exchange (FXO/S) card, T1 card, T3 card, video card and the like. The input signals are converted by these feature cards into digital signals having the proper speeds and formats compatible with the system, and are conducted to a line card, such as a T1 card described previously. The T1 has an interface compatible with tariffed services offered by public carriers, indicated here generally as a private or public network. At the far end of the network the data is received by a T1 line card and distributed to the companion feature cards. The feature cards convert the incoming telecommunications signals into signals that are compatible with the premises equipment or system at the destination.

In the preferred embodiment up to 2 controller cards and 14, line cards and feature cards may be installed in the reconfigurable intelligent multiplexer system. A plurality of multiplexer systems are deployed, each at one node of a telecommunications system. In a fully configured form, each system provides a maximum system capacity of 64 Mbps, which accommodates 1,020 DS-0s, 60 T1 lines, or multiple T3 lines.

Figures 5, 6, 7, 8, 9:
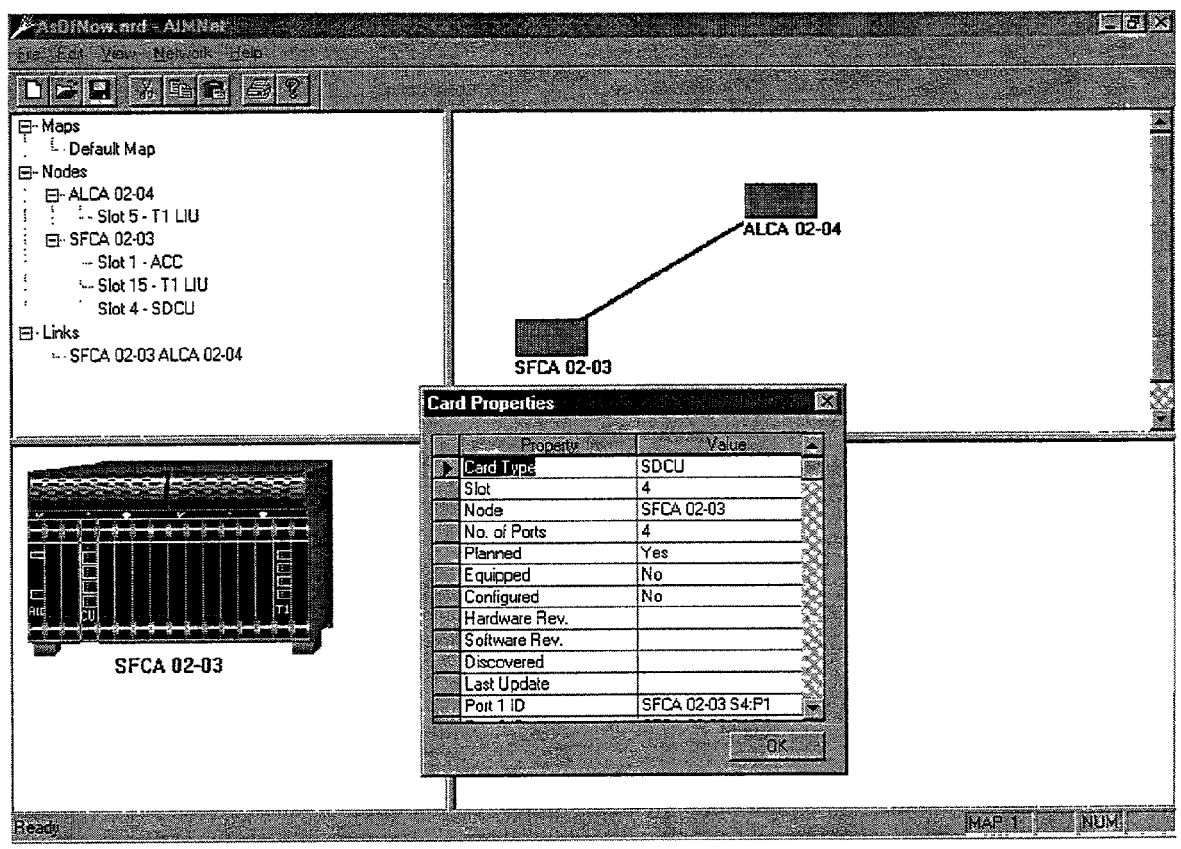

With regard to FIG. 9, the reconfigurable intelligent multiplexer of the invention may be configured as an M13 multiplexer. In this configuration, a node of the system connects a plurality of DS-1 circuits (T1 lines) to the DS-3 level (T3 line). The node operates to consolidate multiple T1 circuits to/from the communications node or to/from LAN/WAN connections. In addition, the system can be used to groom and consolidate DS-0 channels on T1 circuits coming from system nodes into a smaller number of T1s or into a T3 line communicating with another system node.

Figures 5, 6, 7, 8, 9, 10:
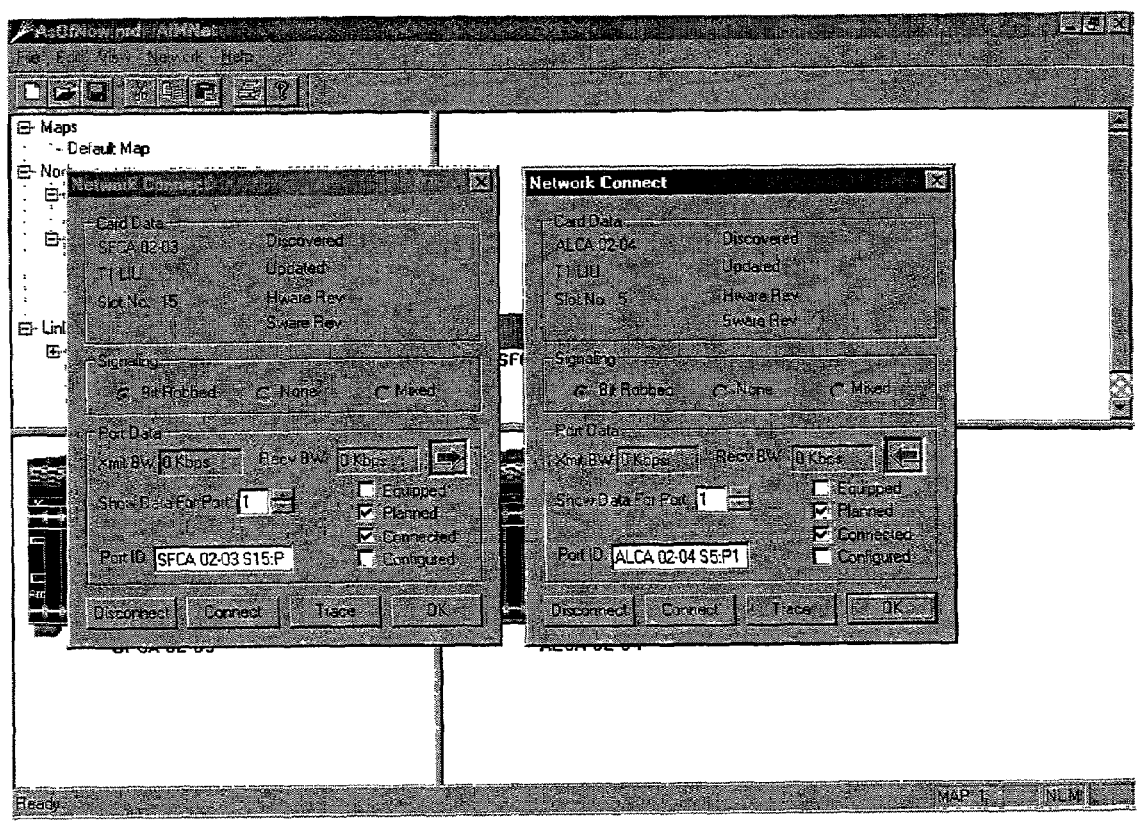

In addition, the system of the invention can operate in a digital cross-connect mode, as shown in FIG. 10. In this mode of operation, a node can operate on T1 circuits to groom individual DS-0s, DS-1s, or DS-3s, as described above. In addition, the node can establish connections in point-to-point fashion among the lines joined to the node, so that the node can set up 56 kbps or 64 kbps voice connections, or n×56 kbps or n×64 kbps where n=1 to 24 data connections among the equipment connected to a single node.

A significant aspect of the invention is the provision of a software control package for the user to enable the establishment of communications nodes, wherein each node is equipped with one reconfigurable intelligent multiplexer, and to establish the communications paths between and among the nodes, as well as the management of the system defined thereby. With reference to FIG. 6, the user control arrangement includes three primary components: the network comprised of the nodes and interconnections, a software shell, and a graphical user interface (GUI) that is displayed on a desktop computer, workstation, or other computer system that provides a graphic display and enables user input through manual means such as a mouse, trackball, touchscreen, verbal commands, or keyed commands, or any combination thereof. It is also significant that the network may be under design, or may be in existence and in operation, so that the tasks of creation, management, and modification of a network may all be carried out by the software shell.

The software shell provides a view manager that creates the display screens of the graphical user interface. The view manager offers three different views of a network: tree view, net view, or node view. The tree view is a tree-like listing of all of the entities (e.g., nodes, spans, cards) in the network. The net view is a graphical representation of the nodes and their associated links, as shown in FIG. 6. The node view is a detailed graphic of an individual node, showing the card equipment as it actually appears in a node. Using the graphical interface, a user may designate nodes, establish spans between nodes, choose cards, ports, and features for each node, and define the circuit links that comprise each span. The view manager passes this data to the design manager module, which uses that data to build routes with the correct number of channels, cards and signaling and store the this information as the network design. This network design information is automatically downloaded to the nodes by a software shell communications manager. Network configuration and routing information can be uploaded to a commercial database such as Oracle™, Access™, or Informix™ via the data exporter module of the software shell.

An example of network design is illustrated by the screen shots of FIGS. 5-1 to 5-12. As shown in FIG. 5-1, the basic screen display of the GUI is a split-window design having four quadrants that are individually scrollable and resizable. The upper left quadrant is a resource tree, listing all network resources used in the design. The resource tree acts as a quick reference for network data. The upper right quadrant is a functional block diagram view of the network, with nodes displayed as rectangles and links between nodes displayed as heavy lines. The user can add or remove nodes and links, or rearrange them, and change the properties of the links by standard GUI click-and-drag techniques that are well known in the prior art. The lower left and right quadrants are space for graphic representations of nodes, the nodes displayed being selected by mouse-clicking on any node in the network view. (Note that the identity of the nodes in the lower quadrants corresponds with the nodes portrayed in network view.) In the node views, users may select any feature card to be installed or removed from the multiplexer 21 that forms the node, and may establish or determine the cards properties and the routing configuration for each port on the card.

Figure 2:
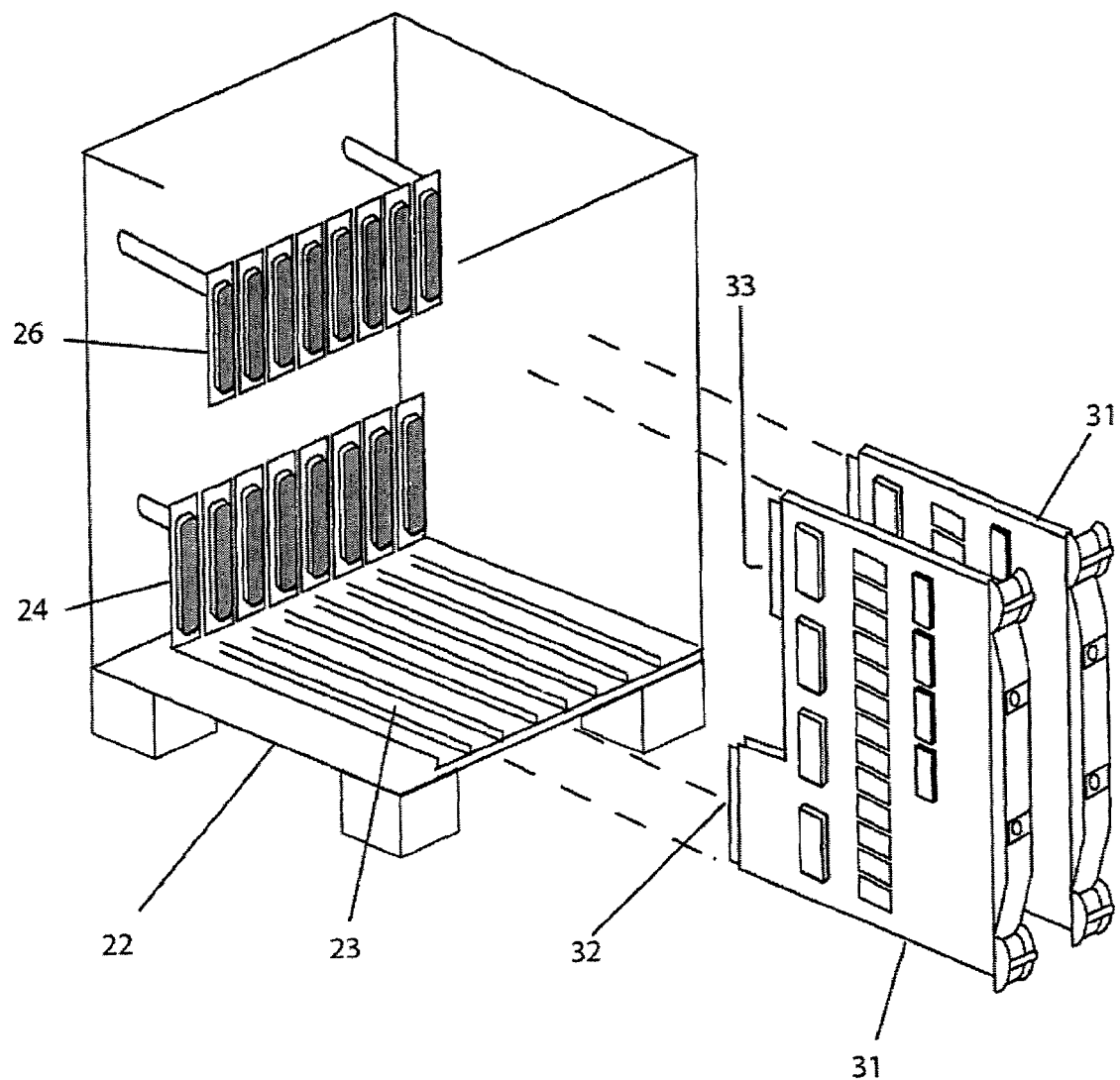
FIG. 2 is a exploded cutaway perspective view of the reconfigurable intelligent multiplexer depicted in FIG. 1

With reference to FIG. 5-2, to initiate a network design, the user first selects the Network pulldown menu, and chooses the type of node to be added from the Add Nodes/Links dialog box. Each node and link must be given a unique name for inventory management and an IP address for network management, as shown in FIG. 5-2. After the dialog box is closed using the OK button, this process may be reiterated to define a plurality of nodes for the planned network.

With reference to FIG. 5-3, the screen display indicates that two nodes have been inserted and named: ALCA02-04 and SFCA02-03. The Network pulldown menu may be selected once again and the Add Nodes/Links dialog box may be used to place a link between the defined nodes, and a unique name is ascribed to the link. The link, which is a logical pathway, may be drawn between the nodes in the network view. Although the example in this Figure is a simple point-to-point network, other configurations such as Y connections (or, logically, star connections) and plural nodes linked serially in linear array or ring array are also possible.

Figure 4:
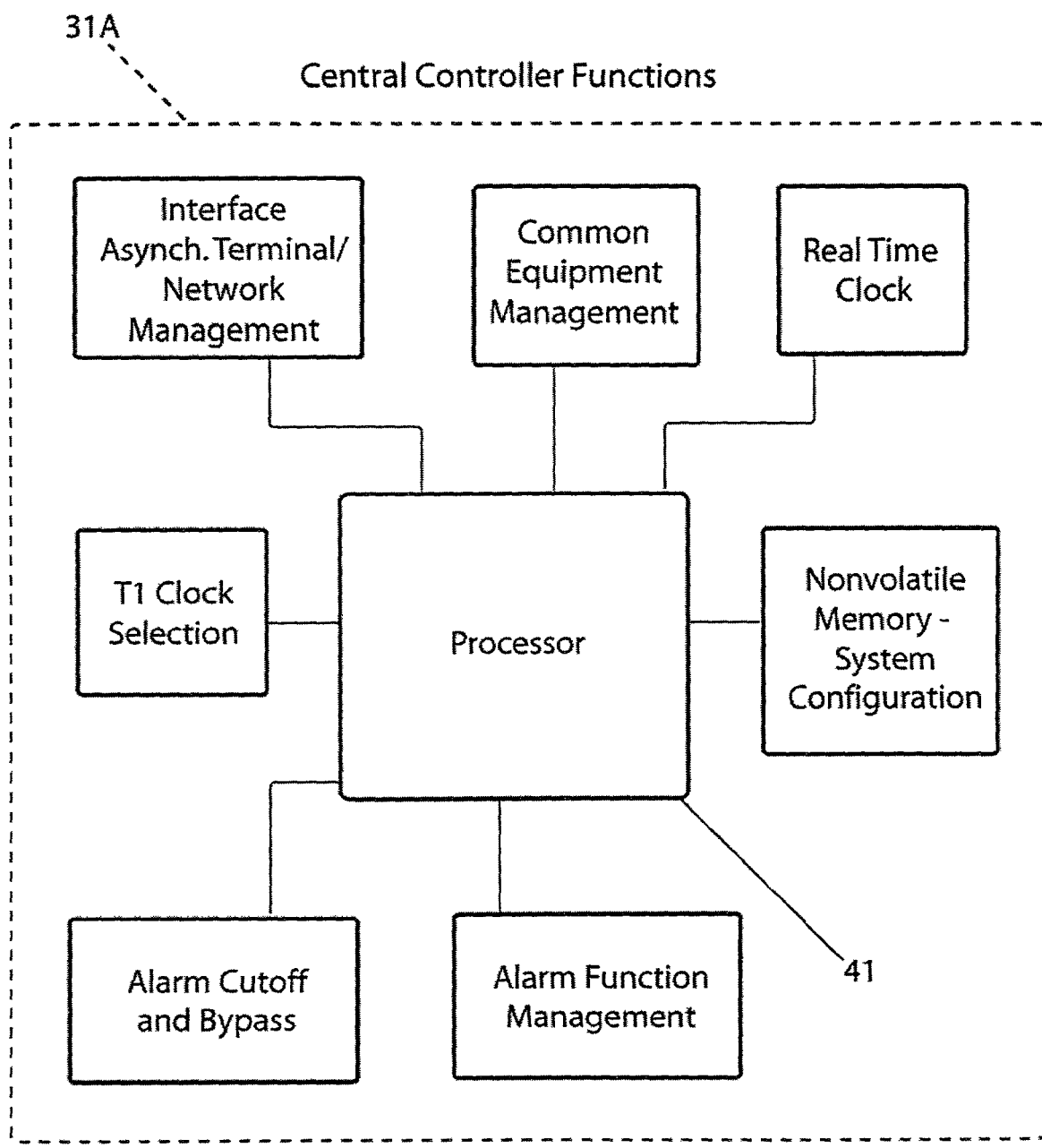
FIG. 4 is a functional block diagram depicting the operational scheme of the central controller of the reconfigurable intelligent multiplexer of the invention.

Nodes and links may be dragged and dropped on-screen and rearranged as desired, and the links will follow the nodes as if they are rubber bands. In FIG. 5-4, note the Tree view showing the nodes and paths that have been placed in the Network view. Note also that the quadrants have been resized to visualize all the nodes in Network view.

Once the network topology has been laid out by specifying nodes and links, the next step, shown in FIG. 5-5, is to add spans, which are the actual telecommunications circuits that form the links. Spans generally include T1 and T3 circuits. Before adding the spans, it is necessary to add the appropriate line interface cards to the nodes. This is accomplished by selecting the node in the network view with the mouse, causing a pop-up context menu to appear which allows the user to display a close-up view of the node in the lower left or right quadrant, as indicated in the FIG. 5-5

With regard to FIG. 5-6, once the nodes are depicted in the node views, the line interface units can be added to enable span interconnections. Double clicking on a card slot presents the Modify Card window from which a card type and card location is chosen. Furthermore, note that the user may specify whether the procedure involves adding or deleting the card, and further specifies whether the card actually exits in a node (Equipped) or is being planned for the node.

The actual node and cards do not need to be in place to perform the network design. The design manager of the software shell marks the cards as planned and reserves the card slots in their respective nodes. The design manager also requires configuring the node for the cards before it will allow spans to be designated. This requirement forms one check performed by the system to maintain consistent and reliable network design.

Thereafter, as shown in FIG. 5-7, spans are added to the network design by using the mouse to select the desired link to evoke a pop-up context menu which enables modifying the link or specifying its properties.

As shown in FIG. 5-8, upon selecting the Modify Link option of the context menu, an Add Span dialog box appears which enables the user to select the type of span desired to be added. This action causes the design manager to search both the source and destination nodes of the span for compatible line interface units, and then displays the first compatible line interface card it finds as well as the card's relevant data, including slot number, port number, and available bandwidth. The dialog box also provides up/down arrows adjacent to the card number and port number windows, so that the user may navigate through the ports on the card, or through the cards installed or planned for the node. The broad arrows disposed to the right of each node identification number are displayed in changeable color: yellow indicates that a connection is possible at the bandwidth indicated; red indicates a connection is not possible because the respective port is already interconnected on another span; and green indicates that the two ports indicated by their numbers are already connected on the span. To complete a connection, the user navigates through the recommended ports and cards until yellow arrows are show for the ports identified in the number window. To connect the ports using the span, the user may either click on the Connect button of the dialog box or on the yellow arrow. To disconnect two ports, the user navigates through the port numbers to select the desired port numbers (both arrow displays will be illuminated green) and clicks on the Disconnect button.

At any time, the user may right click on a node or card and invoke a card properties or node properties menu. The Card Properties menu is shown in FIG. 5-9. These menus form a report of the status of any node or card.

To establish a connection between two ports of two feature cards, the user right clicks the feature cards to be connected on each node. This action causes a Network Connect dialog box to be displayed for each node as shown in FIG. 5-10. These windows display all relevant card data, including transmit and receive bandwidth, route map information, port number and ID, and the like. Once again, broad arrows of variable color are displayed to indicate the availability of the ports; yellow indicates that a connection is possible at the bandwidth indicated; red indicates a connection is not possible; and green indicates that the two ports are already connected. The network connect ability is a unique feature of AIM-Net. It automatically makes connections between 2 ports without the operator having to select individual DS-0 numbers at each node. Without channel connect, the operator would need to individually set up 1344 DS-0 connections for each T3 span and 48 DS-0 connections for each T1 span.

Once the indicated ports are selected for connection, either by clicking on the broad yellow arrow display or on the Connect button, another dialog box titled Confirm Trunk Connection is evoked and overlaid on the Card Properties dialog boxes, as shown in FIG. 5-11. The Confirm Trunk Connection dialog box permits the user to scroll through and select from all available network spans, using the Next Choice button. The user may select the bandwidth desired, using the up/down arrow control adjacent to the Bandwidth displays. Once the connection is set up, the user clicks on the Confirm button, and the Confirm Trunk Connection box disappears. The underlying Card Properties dialog boxes (FIG. 10) then indicates the completed connections by displaying green broad arrows.

The screen displays of FIGS. 5-1 to 5-11 may be used reiteratively to fully layout and configure a network design, or to modify an existing design, or to examine an existing network. The Design Manager of the Software Shell (FIG. 6) assembles and translates all the detailed data regarding node configuration and span connections into a network map. The map is stored by the central controller and may be referenced via SNMP, and may also be transmitted to the nodes if they are preexisting, or to the planned nodes as they are constructed. The translation and transmission of the network map is accomplished using a combination of User Datagram Protocol (UDP) and Transmission Control Protocol (TCP) signaling.

In addition to Network Connect, a Channel connect is available. Right clicking a feature card and then clicking Channel Connect obtains the menu shown in FIG. 5-12. With this menu, a user may individually configure DS-0s within a T1 or T3 span. The use of Channel Connect alleviates the need for this process.

FIG. 5-13 shows the Connection Trace dialog box which can be displayed by clicking Trace on the Network Connect box, FIG. 5-10. This box shows a summary of the connections made.

FIG. 5-14 shows the setup screen for RoF (Route on Failure). In order to fully utilize RoF, 2 more spans were added in the link between SFCA and ALCA. These are shown in the upper left pane as Alt Span SF to AL (a T1 span) and Span SF to AL-T3 (a T3 span).

The Span Protection dialog box initially presents a mathematically derived suggestion of span failure priorities and then allows the user to modify any suggested path by using the pull down menus within the Span Protection Dialog box.

The data generated from these dialog boxes (FIGS. 5-12 to 5-14) is managed using a Microsoft Windows™ archiving feature; that is, the same mechanism used by other Windows™ applications such as MS Word™. Data may also be exported to any ODBC-compliant database such as Oracle™, Sybase™, MS Access™, or MS SOL™.

The screen shots of FIG. 5 do not comprise an exhaustive illustration of all the windows and control options available to a user of the GIU of the invention. The screen shots shown are presented to depict the significant control features of the Software Shell that enable the user to perform all the necessary tasks involved in layout, design, configuration, and connection of the node hardware, starting from a broad conceptual view of nodes and links and proceeding to a detailed scheme of card selection, and card/port connections. Moreover, the same Software Shell may be employed after the planning stage to interact with the existing node hardware of a network, to reconfigure the nodes, re-map the node connections, or add or remove nodes, feature cards, line cards, or spans between nodes.

Conventional approaches to Route-on-Failure are based on two methods, node arbitration and centralized management.

In node arbitration maps are maintained by every node, and each node has a copy of adjacent node tables. In the event of failure the node first detecting the failure finds an alternate route and updates its map to reflect the change. It then passes the updated table to other affected nodes, so they can update their tables in turn. In some cases nodes are designated as masters for certain routes, allowing them to act as the principle source of routing assignments. For this method to be effective nodes generally maintain complex maps that often describe routing well beyond their immediate sphere of control. That depth of knowledge is needed to enable the nodes to fins alternate routes in the event of failure.

A second method of route updates during failure relies on centralized management, generally by an element management system (EMS) or a network management system (NMS). In this arrangement all of the maps for the entire network are maintained by the EMS/NMS. Each node only has information relevant to the facilities it supports. When a failure occurs, the affected nodes report the failure to the EMS/NMS. There, algorithms are invoked to find the best means of re-routing network traffic to bypass the affected span(s).

These two approaches share a common weakness. They rely on inter-nodal communication to identify the failure, gather information for decision making, and communicate the new routing scheme to the affected network nodes. The difficulty is that the communications links are often affected by the failure. To counter act this possibility complex alternate communication paths and schemes are needed. Even when these schemes work they often delay the invocation of the new routing plan.

The invention's fault tolerant routing design uses proprietary algorithms to assign weights to connections, based on user designated priorities. It then assigns priorities to physical spans, based on the users assessment of their reliability. In the event of failure, connections are reassigned to spans using an algorithm that optimally matches connections to routes, based on the route-weight and the span reliability. That method takes advantage of a centralized management systems, AIM-Net, and the knowledge it has of all network routing to prepare routing plans during non-failure conditions. However, by pre-assessing all combinations of span failures and assigning the proper weights, communication between nodes is not needed during failure conditions. The weighting tables are assigned in a manner that allows the correct routing choices to be made automatically by applying the algorithm to the existing spans, using the weighting system.

AIM-Net manages communications at two levels, the element level and the connection level. In practice connections don't fail because they are a virtual object. Real objects, or elements, such as TI spans and line cards fail, causing connections to fail. AIM-Net simplifies failure re-routing design by managing connections on a span basis. High priority connections are grouped together on those spans expected to have the highest reliability, or availability. Low priority connections are assigned to low priority spans. In the event the low priority spans fail, no re-routing occurs, precluding disruption of high priority connections. In the event a high priority span fails low priority connections are replaced by higher priority connections on the low priority span. The advantages of this approach are the simplicity of management and predictability, and the ability to re-route priority traffic without communicating with a centralized management system, or contacting other nodes.

Another key principle applied to route failure management is that of scope. Scope, in this context, refers to the number of network elements considered when designing and effecting failure routing. AIM-Net's implementation limits the scope of the feature to two adjacent nodes. Routing design and tables are built to protect against failures on common inter-nodal spans, and on AIM cards where high priority traffic can be re-routed using lower priority inter-nodal spans. AIM-Net does not support routing around a failed node, although it is possible to use AIM-Net's failure routing feature to do just that. This approach is justified since AIM is a fully redundant system, with duplex processors, fans, power supplies, etc. The chances of a complete node failure are minute compared to the probability of a span failure.

A final principle is that of depth. Users are allowed to specify how many alternate routes can be considered under failure re-routing. There is a tradeoff involved in selecting the proper depth. The greater the alternatives the higher the probability that high priority traffic will be processed. However, with a greater number of alternatives comes increasing complexity of processing and a higher probability of connection re-arrangement, potentially with diminishing return.

To illustrate this capability consider an example; nodes 1, 2, and 3 are connected in a ring configuration, and each node comprises a shelf unit 22 as described previously. Nodes 1 and 2 are connected by spans A and B, nodes 2 and 3 are connected by spans E and F, and nodes 1 and 3 are connected by spans c and d. Connected to each node are user groups passing traffic across the network. These users generate a combination of voice and data traffic that are, in general, channel sources and sinks $T_n$–$T_m$. These channels are assigned one of three levels of Priority $P_1$ $P_2$ and $P_3$ where $P_1$ is the highest priority. A primary route is required for each traffic source; that is the route used under non-failure conditions. Up to two alternate routes may be designated for each traffic source, the alternate routes to be used in the event of failure of the specified primary route, in accordance with the assigned channel priority.

During normal operation sufficient bandwidth exists for all user groups to be routed according to a set routing plan using primary routes. A default routing plan is created by the network operator specifying all channels and routes for all traffic. As described above, the AIM-Net software monitors network resources during routing design and will not allow the user to submit a design that cannot be implemented because of resource or design limitations. During a span failure one or more of the spans A–F become unavailable. Span failures and restorations are treated as triggering events. As these events occur AIM-Net routes traffic based upon the state of the network after the event has occurred, without regard to the order of failure of spans. All traffic is grouped as shown in the three tables below, based on the assigned channel priority. In the example traffic $T_0$–$T_{23}$ between node 1 and node 2 is normally routed on span A, channels $A_0$–$A_{23}$ respectively. Traffic $T_{24}$–$T_{47}$ is normally routed on span B, channels $B_0$–$B_{23}$.

TABLE 1

| | Priority 1 Traffic | |
|---|---|---|
| Routes | $T_0$–$T_9$ | $T_{24}$–$T_{33}$ |
| Primary Route | $A_0$–$A_9$ | $B_0$–$B_9$ |
| First Alternate | $B_{10}$–$B_{19}$ | $A_{10}$–$A_{19}$ |
| Second Alternate | — | — |

TABLE 2

Priority 2 Traffic

| Routes | $T_{10}$–$T_{13}$ | $T_{34}$–$T_{37}$ |
|---|---|---|
| Primary Route | $A_{10}$–$A_{13}$ | $B_{10}$–$B_{13}$ |
| First Alternate | $B_{20}$–$B_{23}$ | $A_{20}$–$A_{23}$ |
| Second Alternate | — | — |

(AIM-NET

In this example two dimensions of priority assignment are demonstrated: explicit priority and implicit priority. Explicit priority is obtained by assigning traffic priority values of $P_1$, $P_2$ and $P_3$. All traffic of higher priority is routed first before lower priority values are considered. Implicit priority is set by placement of a traffic type in a table. In the example above $T_{34}$–$T_{37}$ have the same priority as $T_{10}$–$T_{13}$ but do not survive the failure of span A. Because the algorithm must have a search priority, routes placed in the beginning of the table have an advantage and may use routes listed for other traffic in the same table.

Figures 5, 6, 7, 8, 9, 10, 11:
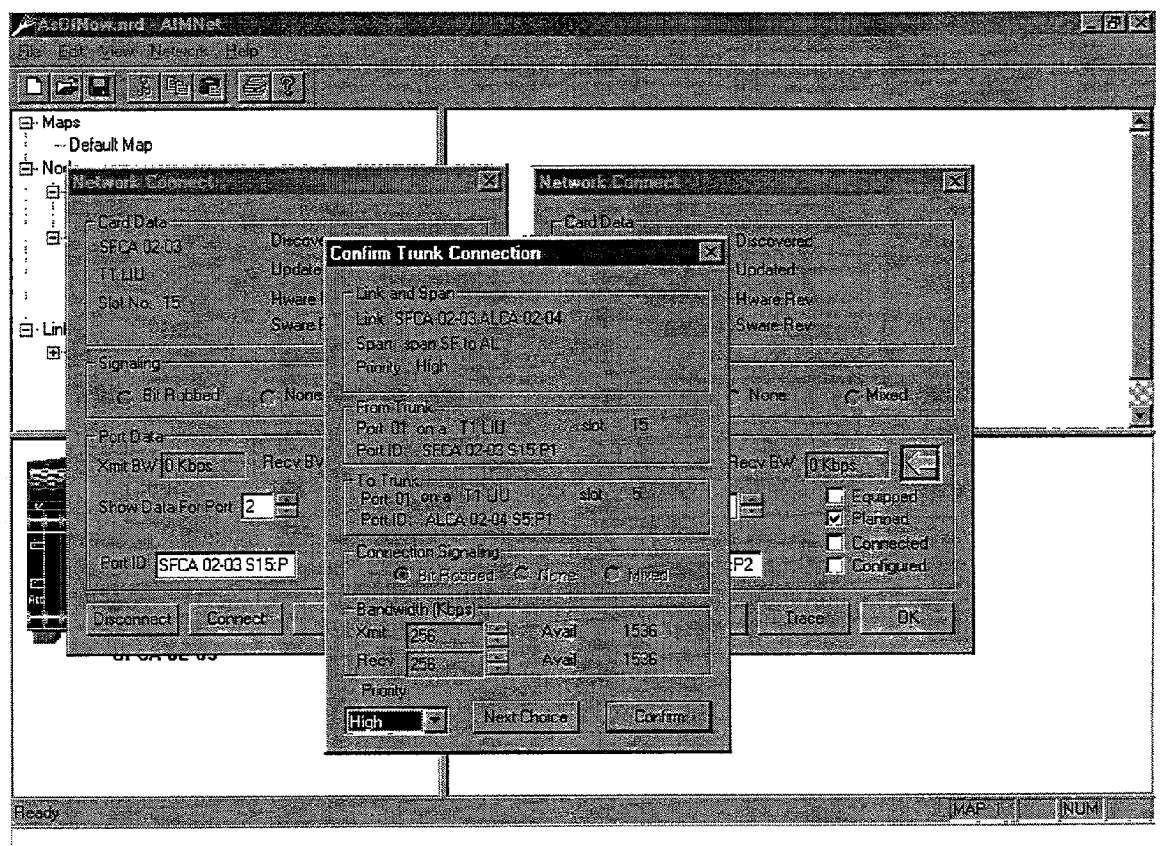

The example of FIG. 11 can be expanded by reserving four channels $C_0$–$C_3$ and setting them up as a tandem route on node 3, via $E_0$–$E_3$. The revised tables then appear as shown below

TABLE 3

Priority 1 Traffic

| Routes | $T_0$–$T_9$ | $T_{24}$–$T_{33}$ |
|---|---|---|
| Primary Route | $A_0$–$A_9$ | $B_0$–$B_9$ |
| First Alternate | $B_{10}$–$B_{19}$ | $A_{10}$–$A_{19}$ |
| Second Alternate | $C_0$–$C_1/E_0$–$E_1$ | $C_2$–$C_3/E_2$–$E_3$ |

TABLE 4

Priority 2 Traffic

| Routes | $T_{10}$–$T_{13}$ | $T_{14}$–$T_{37}$ |
|---|---|---|
| Primary Route | $A_{10}$–$A_{13}$ | $B_{10}$–$B_{13}$ |
| First Alternate | $B_{20}$–$B_{23}$ | $A_{20}$–$A_{23}$ |
| Second Alternate | $C_0$–$C_3/E_0$–$E_3$ | $C_0$–$C_3/E_0$–$E_3$ |

Priority 3 Traffic remains unchanged. The tertiary route $C_0$–$C_3/E_0$–$E_3$ is reserved to carry mission-critical traffic, which is normally assigned to routes A ($T_0$–$T_1$) and B ($T_{24}$–$T_{25}$) and no traffic from node 2 is assigned to this route. If both spans A and B fail, the mission-critical traffic will survive via the tertiary route. Note that node 2 has no knowledge of the rerouting event and is strictly passive. As a side benefit $T_{34}$–$T_{37}$ can use the tandem route when span A fails and $T_{10}$–$T_{13}$ can use the tandem route when span B fails.

The priority routing scheme is an option that may be implemented in the AIM-NET Manager. A conformal database is constructed by the Manager and transmitted to the central controller(s) of each node using FTP. Connections are given a sequential number associated with them from o-n, where n is less than 8000. The central controller will process those connections according to the associated priority number.

Figures 5, 6, 7, 8, 9, 10, 11, 12:
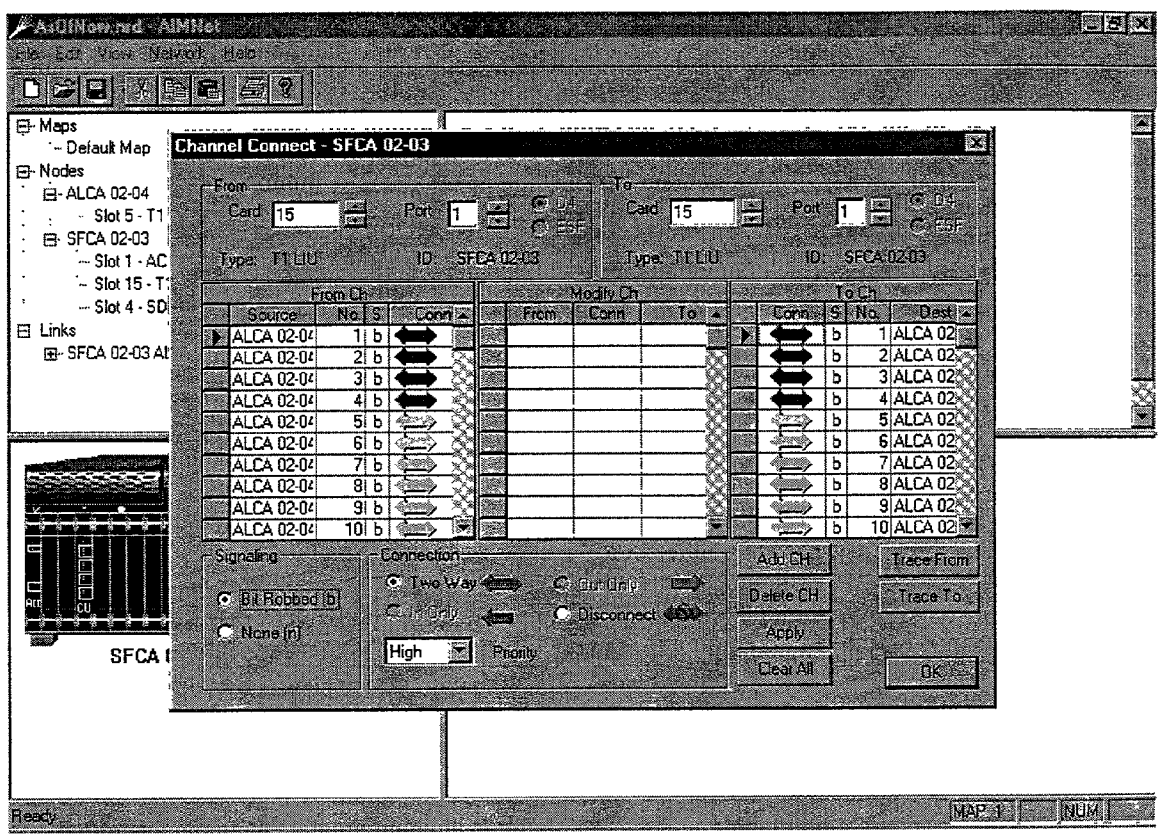

To accommodate the potential for node failure, the system provides the option of constructing each node in a redundant configuration, as shown in FIG. 12. A node may be provided with two coupled shelf units 21a and 21b, each having dual power supplies and fan assemblies. In addition, dual central controller cards (ACC) are installed. This arrangement can be configured as either a single shelf serving up to fourteen feature cards, or a dual shelf system serving up to thirty feature cards. When configured as a duplex dual shelf system each shelf is independently powered and cooled by duplex power supplies and fan assemblies. However, only one set of ACC cards is needed for the two-shelf system. One ACC card is designated as primary and must occupy slot 0 of shelf 21a and the second ACC card can occupy any other slot other than slot 0 of shelf 21b. Dual power feeds, either 110 V AC (ACA, ACB), or −48 VDC (DCA, DCB) can be used to provide power to the system. DC and AC feeds cannot be mixed on the same system, nor can power be fed from one shelf unit to the other. The node shown in FIG. 12 for example only is equipped to connect a plurality of T-1 lines and other traffic and transmit along a T3 (or E3) span.

In this redundant arrangement, each subsystem, such as power supply, is independent of the other subsystems. For example, in the event that one power supply fails, both fan assemblies will continue to operate. The only exception to this rule regards power feeds and power supplies: power feeds DCA and DCB, or ACA and ACB are dedicated to the supplies they feed and are not cross-wired. For example, if either power supply DCA or ACA fails, the power supply connected thereto will cease operation, but the other power supply continues to operate, and the system can function normally with one power supply. The primary central controller ACC card monitors all voltages of both power supplies and reports a failure via an alarm trap. Likewise, a failure of a power supply will not cause service interruption. Other mechanical systems failures, such as the cessation of one fan assembly, will not stop operation of the unit, although the system temperature may rise beyond normal specifications, depending upon the configuration of the system. Elevated temperatures do not pose an immediate service jeopardy, but should be corrected as soon as possible, due to the fact that elevated temperatures cause premature aging of the electronic components. Excessive temperature is reported by the primary ACC as an alarm trap.

Regarding the failure of electronic components, the dual ACC arrangement permits one ACC card to be a primary operational device, and the other is reserved in standby. If the active ACC card fails, errors may occur for transient events and access may be delayed until the standby ACC card has fully switched to the active mode. In the event of an ACC card failure the standby ACC card will report an unexpected mate switch and initialization as part of the changeover process, via an alarm trap.

Figures 5, 6, 7, 8, 9, 10, 11, 12, 13:
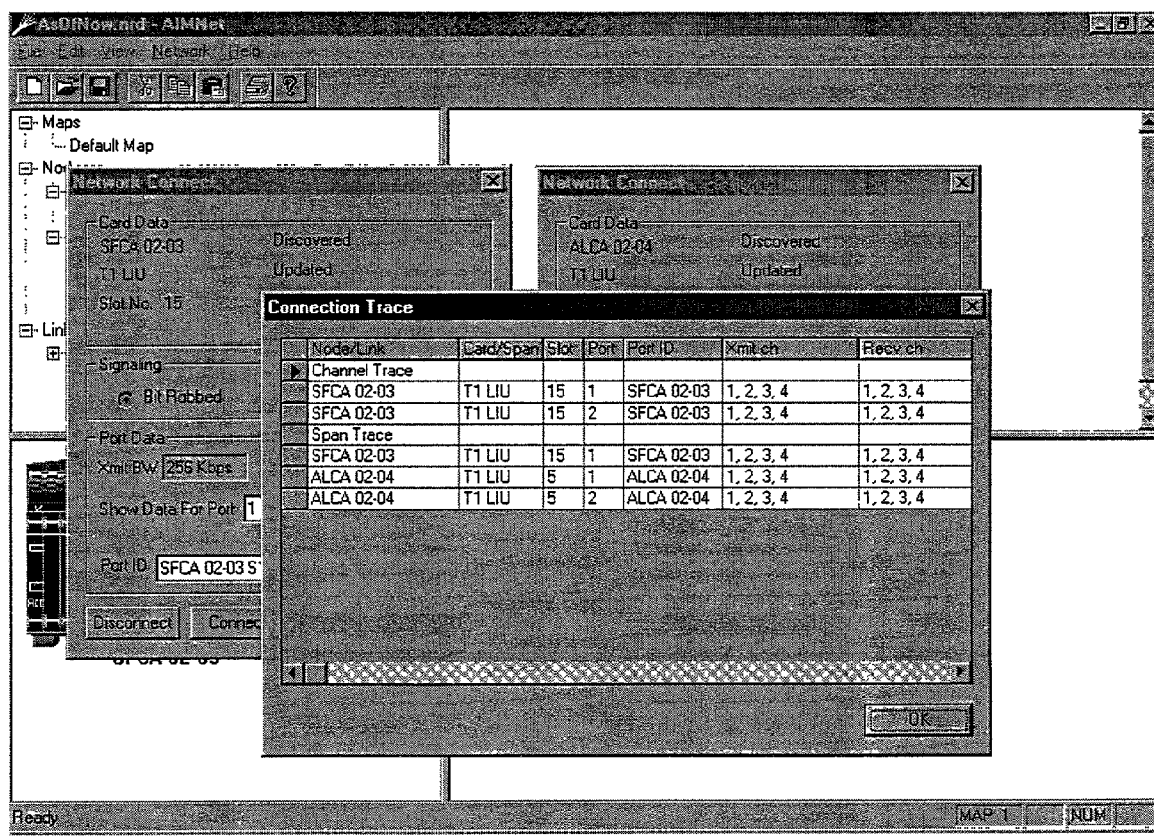

With regard to FIG. 13, a node may be configured in fully redundant mode using two shelf units 21c and 21d to perform as a M13 multiplexer, as described with reference to FIG. 9. A single T-3 span terminates on two T-3 LIUs (Line Interface Units), one LIU being designated as active and the other being a standby. In the event the active LIU fails, the primary ACC card detects the failure, activates the standby LIU, and remaps all circuits to the newly activated unit. Service is affected only briefly during changeover. Other electronic component redundancies provided, such as the dual ACC cards and dual T-I cards in each unit, are arranged in similar active/standby pairs to prevent node failure.

Figures 5, 6, 7, 8, 9, 10, 11, 12, 13, 14:
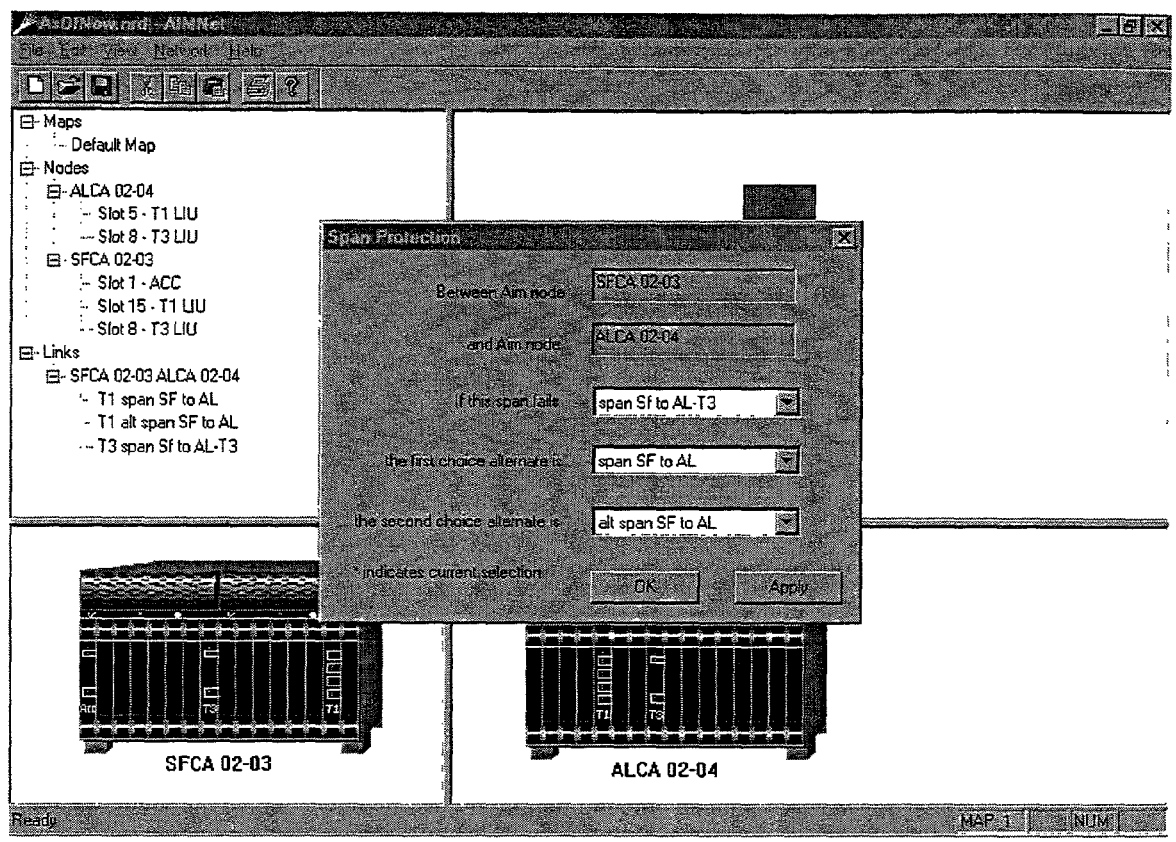
Figure 6:
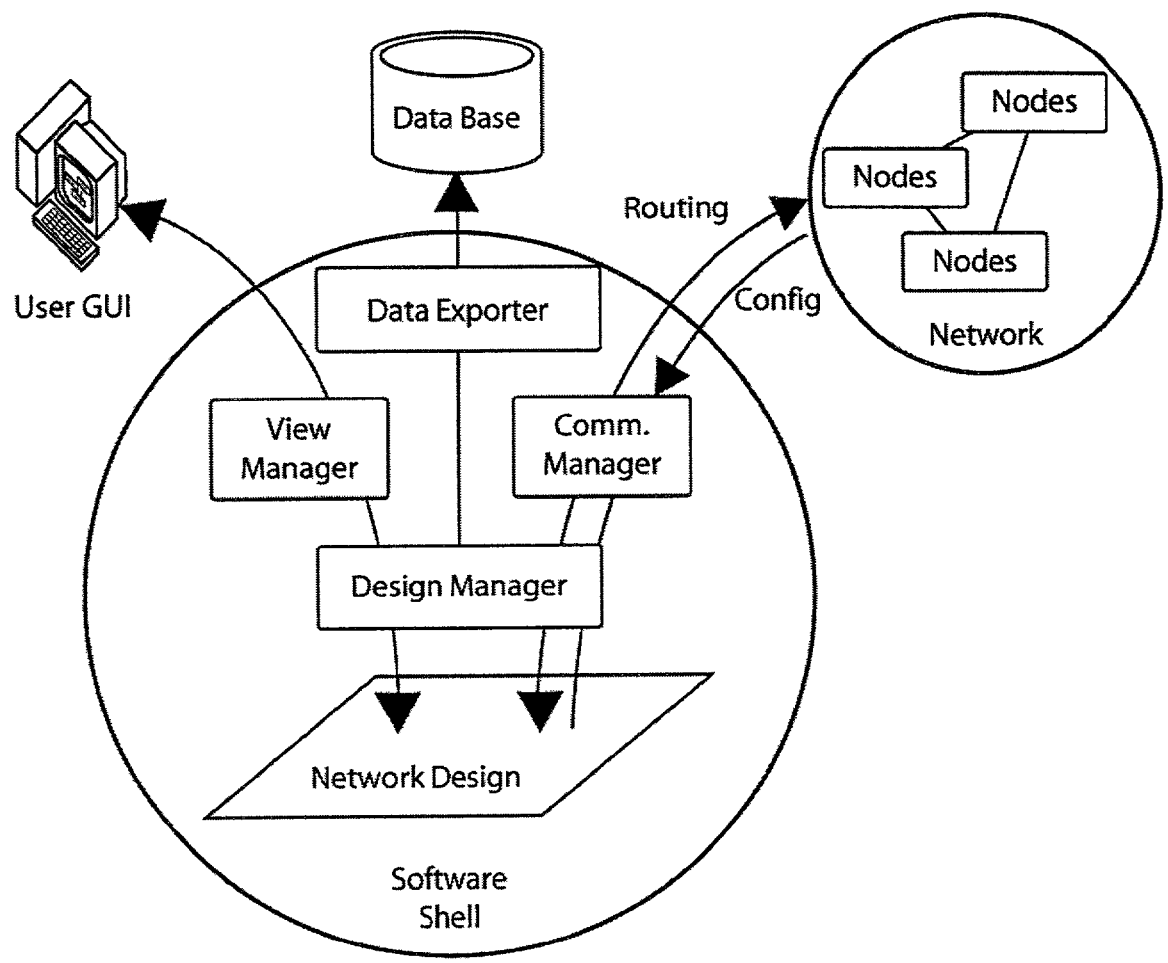
Figure 7:
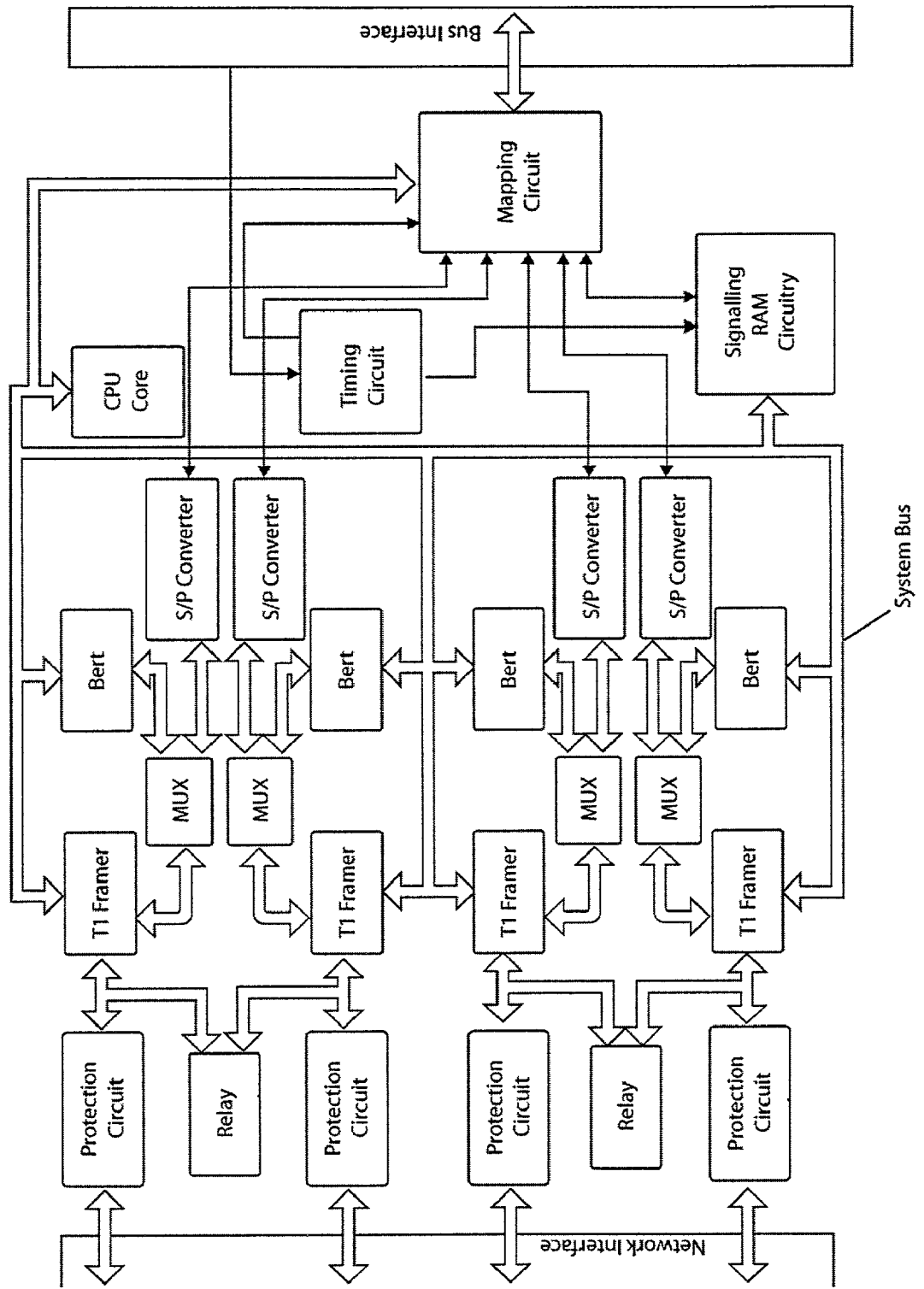
Figure 8:
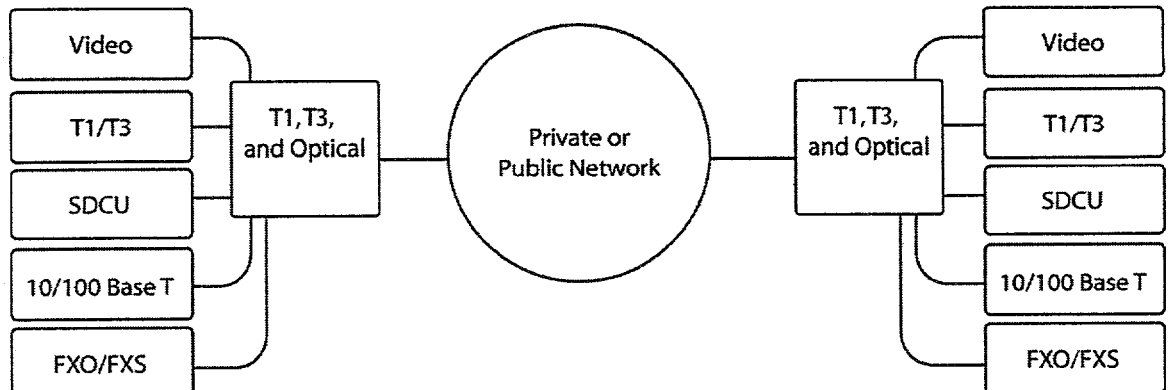
Figure 9:
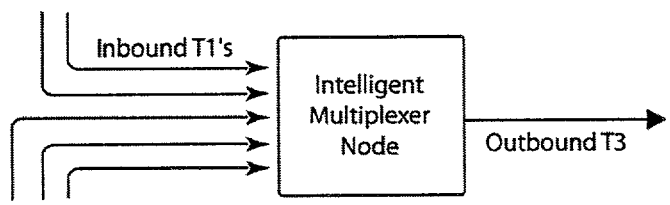
Figure 10:
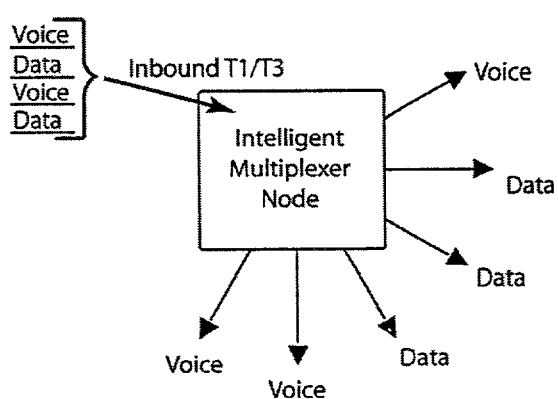

With regard to FIG. 14, a contrasting minimal arrangement for an M13 node is a simplex system in which two shelf units 21e and 21f are coupled to serve as the node, with each shelf unit having a single power supply and dual fan assemblies (there is no savings realized in using one fan assembly). In this configuration a failure of either a power supply, power feed, or ACC card will cause a complete system failure. However, this minimal configuration provides the requisite service at the lowest possible cost.

Figures 14, 15:
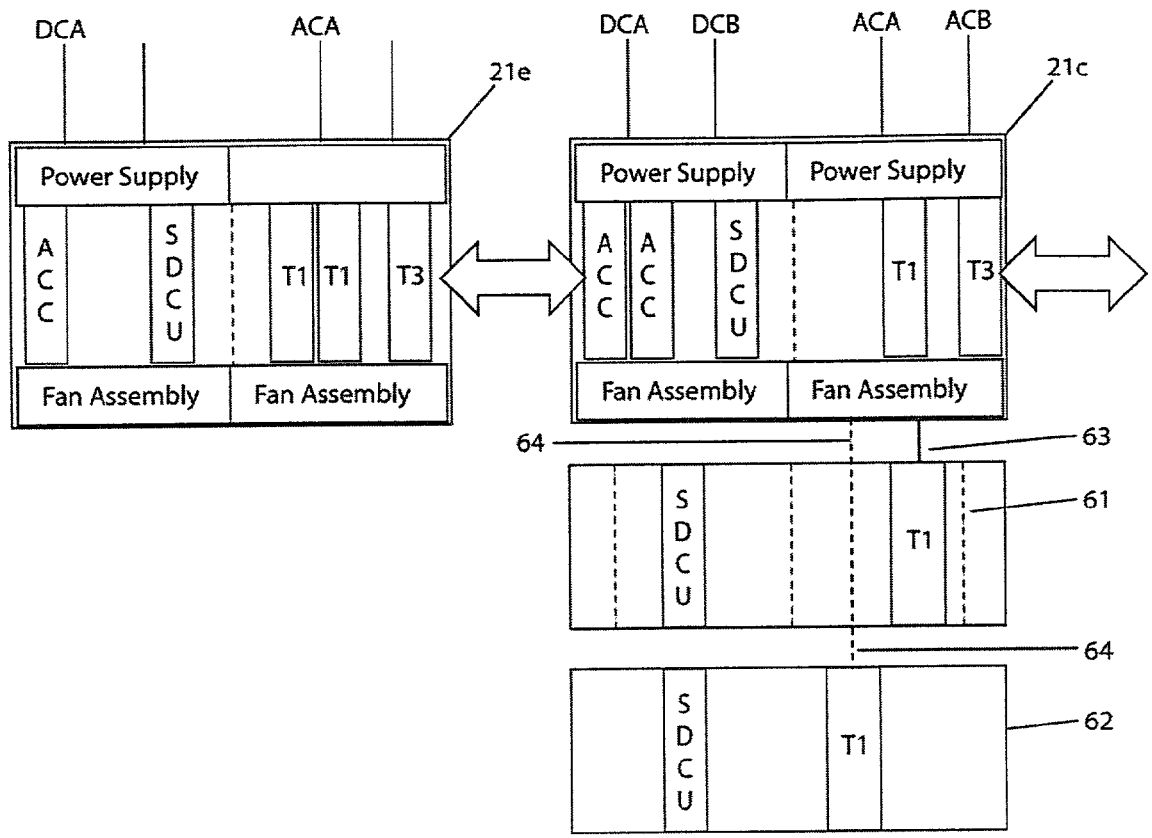

With regard to FIG. 15, the components described above may be combined to create a high bandwidth D/I Mux (drop-and-insert multiplexer) hub for a transmission network. A shelf unit 21g is provided with dual power supplies and fan assemblies, and dual ACC central controller cards in fully redundant fashion. In addition, a synchronous data channel unit card (SDCU), a T-1 line interface card, and a T-3 LIU are installed. Subtending D/I Mux systems and 62 are connected to the unit 21g via T-1 spans 63 and 64, whereby the unit 21g acts as a T-1 concentrator, collecting T-1 spans from the subtending systems 61 and 62 and multiplexing their spans onto a T-3 span for network connectivity. This arrangement is cost-effective when the number of T-1 spans being used exceeds approximately eight.

Figure 16:
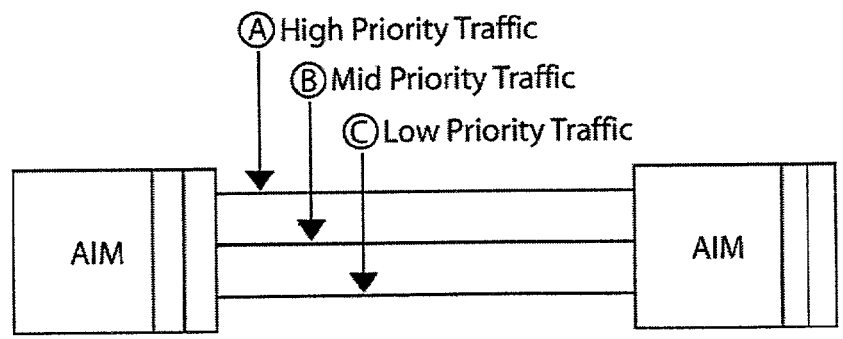
FIG. 16 is a block diagram showing AIM configured for Route-on-Failure (RoF) operation.

With regard to FIG. 16, two AIMs may be connected with numerous T1 or T3 lines. In the connection methodology shown, if span A fails, A's traffic will displace B span's traffic and B span's traffic will displace C spans traffic. The low priority traffic of span C will be interrupted. When the malfunction of span A is corrected, traffic will return to the original configuration.

If span B fails, span B's traffic will use span C thus disrupting span C's traffic. Again, restoration is automatic.

To summarize the important aspects of the invention, it includes a hardware system that enables a user to construct an intelligent multiplexer node of a telecommunications system that is reconfigurable, remappable, sized to accommodate a defined volume of traffic, and modifiable to provide the feature cards and line cards that may be required for anticipated purposes. The node hardware enables direct telecommunications connections to all the feature cards and line cards through backplane connectors, and further provides midplane connectors that join all the feature cards and line cards on a high bandwidth digital bus.

The AIM provides line quality testing in the form of BERT thus eliminating the user's having to purchase, install and maintain additional test equipment. In addition, the Software Shell provides an interface between the virtual world of the network design and the real world of node hardware and span connections. The GUI provides a data base of a plurality of maps, each of which sets all the connections of a network, and enables a user to load, unload, revise, and add new maps to a network. The use of SNMP agents and sub-agents onboard each line card, feature card, and central controller card permits a user to control the network functions by employing a SNMP manager connected to the network through an intranet or Internet.

Also, the hardware system permits the design of nodes that are fault tolerant, able to overcome electromechanical systems failures as well as electronic assembly failures. The networks formed by the nodes are also fault tolerant, using the intelligent node concept to effect remapping of connections to preserve priority traffic in the event of span failure, or reconfiguration of span connections to maintain looped networks.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A network node comprising:
   at least one controller;
   at least one network interface, where each network interface is coupled to the at least one controller, has at least one network port and wherein there are a plurality of network ports;
   at least a first and a second channel elements selected from the group consisting of network ports, channel sources, and channel sinks, the channel elements capable of passing traffic to network ports of the plurality of network ports;
   a memory system associated with the at least one controller, the memory system storing a configuration of the node, the configuration of the node comprising at least
   at least one map, capable of representing
      at least a first and a second primary route designator, and
      at least a first-secondary route designator,
   where each route designator associates at least one channel element with a network port of the plurality of network ports, and where each route designator is associated with a priority;
   where the first primary route designator and the first secondary route designator associate at least one common channel element with different network ports of the plurality of network ports;
   where a map is designated an active map,
   where in a first mode the network node is configured to pass traffic according to the first and second primary route designators of the active map, and in a second mode the network node is configured to pass traffic according to the first secondary route designator of the active map; and
   wherein the network node transitions from the first mode to the second mode when a failure prevents passing traffic according to the first primary route designator, thereby providing redundancy for traffic from the common channel element.

2. The network node of claim 1, wherein:
   the active map further comprises at least a first tertiary route designator;
   the first primary route designator and the first tertiary route designator associate at least one common channel element with different network ports of the plurality of network ports;
   there is a third mode wherein the network node is configured to pass traffic according to the first tertiary route designator; and wherein the network node transitions from the first mode to the third mode when a failure prevents passing traffic according to the first primary route designator and a failure prevents passing traffic according to the firstsecondary route designator, thereby providing additional redundancy for traffic from the common channel element; and wherein the network node transitions from the second mode to the third mode when a failure prevents passing traffic according to the firstsecondary route designator.

3. The network node of claim 2, wherein the network node is capable of detecting repairs and wherein transitions from the third mode to a mode selected from the group consisting of the first mode and the second mode when a repair is detected that permits passing traffic according to a route designator selected from the group consisting of the first route designator and the second route designator.

4. The network node of claim 1, wherein the first primary route designator has a higher priority than the second primary route designator, and wherein a transition from the first mode to the second mode is capable of bumping traffic routed according to the second primary route designator.

5. The network node of claim 4, where the network ports comprise ports compatible with links selected from the group consisting of T1 links and T3 links.

6. The network node of claim 4, wherein the at least one controller comprises a plurality of controllers coupled in a failover configuration.

7. The network node of claim 1, wherein the active map further comprises a second secondary route designator; wherein the first secondary route designator and the second primary route designator share a common network node, and wherein when a failure prevents passing traffic according to the first primary route designator, that traffic is rerouted according to the first secondary route designator, and traffic routed according to the first secondary route designator is rerouted according to the second secondary route designator.

8. The network node of claim 1, further comprising a graphical user interface network manager for configuring the at least one map, and wherein the graphical user interface network manager is capable of generating suggested alternate routes for selection by a user for configuration as secondary routes.

9. The network node of claim 8, wherein the graphical user interface network manager for configuring the at least one map is capable of storing a priority with each primary route designator, and wherein the suggested alternate routes are generated according to the priorities of primary route designators and other network information.

10. The network node of claim 8, wherein the graphical user interface network manager for configuring the at least one map is capable of configuring the at least one map with route designators having at least two levels of alternate routes for each primary route designator.

11. A graphical user interface network manager for configuring network nodes, the graphical user interface network manager capable of constructing a plurality of maps for configuring the network nodes, each network node having a plurality of network ports and a plurality of channel elements selected from the group consisting of network ports, channel sources, and channel sinks, the network node capable of passing network traffic from the plurality of channel elements to network ports of the plurality of network ports, wherein the graphical user interface network manager is capable of configuring each map with a plurality of route designators comprising at least:

a primary association of at least one channel element with a network port of the plurality of network ports for passing traffic, a priority, a first alternate association of at least one channel element with a network port of the plurality of network ports for passing traffic upon inability of the network node to pass traffic according to the primary association, and a second alternate association of at least one channel element with a network port of the plurality of network ports for passing traffic upon inability of the network node to pass traffic according to the primary association;

wherein the graphical user interface network manager is capable of presenting iconic representations of intelligent multiplexers at each node of a network together with representations of spans of the network, and permits a user to modify the equipment at each node during the process of laying out the spans of the network.

12. The graphical user interface network manager for configuring network nodes of claim 11, wherein the graphical user interface network manager is capable of suggesting at least one alternate association based upon the priorities of route designators and other information of the map.

13. The graphical user interface network manager for configuring network nodes of claim 12, wherein the graphical user interface network manager is capable of entering a third alternate association of at least one channel element with a network port of the plurality of network ports for passing traffic upon inability of the network node to pass traffic according to the primary and secondary associations.

14. A network comprising:

a plurality of network nodes,
   each network node comprising at least one controller and having a plurality of network ports,
   where each network node is capable of passing traffic between network ports and channel elements selected from the group consisting of traffic sources, traffic sinks, and network ports;

a plurality of spans, each span coupled to pass traffic between a network port of a network node of the plurality of network nodes, and a network port of a different network node of the plurality of network nodes, wherein each network port coupled to a span has a status comprising a failure indicator that indicated whether traffic can be passed through the network port over the span;

wherein the at least one controller of each network node has a memory system which enables the RoF associated therewith, the memory system storing a configuration of the node, the configuration comprising at least one map capable of representing at least a first and a second primary route designator, and at least a first alternate route designator associated with the first primary route designator, at least a second alternate route designator associated with the first primary route designator, where each route designator associates at least one channel element with a network port of the plurality of network ports, and where a map of the at least one map is designated an active map;

where each network node passes traffic according to the first and second primary route designators of its active map if all network ports of the node have failure indicators that do not indicate failure;

where each network node passes traffic according to its first alternate route designator associated with the first primary route designator if a failure indicator of a network port associated by the first primary route designator indicates failure, and where traffic passed according to the second primary route designator is bumped if the second route designator associates a network port associated by the first alternate route designator and traffic is passed according to the first alternate route designator; and where each network node passes traffic according to its second alternate route designator associated with the first primary route designator if a failure indicator of network ports associated by both the first primary route designator and the first alternate route designator indicates failure.

15. The network of claim 14, where the spans comprise spans selected from the group consisting of T1 spans and T3 spans.

16. The network of claim 14, wherein the at least one controller of at least one network node comprises a plurality of controllers coupled in a fail-over configuration.

17. The network of claim 16,
wherein the at least one map of at least one network node of the plurality of network nodes further comprises:
a plurality of maps, wherein each map further comprises a schedule block, and
a real time clock; and
wherein maps of the plurality of maps of the at least one network node are made active according to correspondence of the real time clock with time-of-day information and day-of-week stored in the schedule block.

18. The network of claim 17, further comprising a graphical user interface network manager for configuring the at least one map of each network node, and wherein the graphical user interface network manager is capable of generating suggested alternate routes for selection by a user for configuration as alternate routes.

19. The network of claim 18, wherein the graphical user interface network manager for configuring the at least one map of each network node is capable of storing a priority with each primary route designator, and wherein the suggested alternate routes are generated according to the priorities of primary route designators and other network information.

20. The network of claim 19, wherein the graphical user interface network manager for configuring the at least one map of each network node is capable of configuring the at least one map of each network node with route designators comprising at least two levels of alternate routes for each primary route designator.

\* \* \* \* \*